United States Patent
Tien et al.

(10) Patent No.: US 9,058,307 B2
(45) Date of Patent: Jun. 16, 2015

(54) PRESENTATION GENERATION USING SCORECARD ELEMENTS

(75) Inventors: Ian Tien, Seattle, WA (US); Corey Hulen, Sammamish, WA (US); Chen-I Lim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1367 days.

(21) Appl. No.: 11/627,640

(22) Filed: Jan. 26, 2007

(65) Prior Publication Data

US 2008/0184099 A1  Jul. 31, 2008

(51) Int. Cl.
*G06F 17/21* (2006.01)

(52) U.S. Cl.
CPC ..................... *G06F 17/21* (2013.01)

(58) Field of Classification Search
CPC ....................................................... G06F 17/21
See application file for complete search history.

(56) References Cited

U.S. PATENT DOCUMENTS

| | | | |
|---|---|---|---|
| 5,018,077 A | 5/1991 | Healey | 715/509 |
| 5,233,552 A | 8/1993 | Brittan | 708/445 |
| 5,253,362 A | 10/1993 | Nolan | 707/1 |
| 5,404,295 A | 4/1995 | Katz et al. | 715/231 |
| 5,473,747 A | 12/1995 | Bird | 715/848 |
| 5,615,347 A | 3/1997 | Davis et al. | 715/833 |
| 5,675,553 A | 10/1997 | O'Brien, Jr. et al. | 367/135 |
| 5,675,782 A | 10/1997 | Montague et al. | 726/4 |
| 5,680,636 A | 10/1997 | Levine | 715/512 |
| 5,758,351 A | 5/1998 | Gibson et al. | 707/104 |
| 5,764,890 A | 6/1998 | Glasser et al. | 726/11 |
| 5,778,364 A | 7/1998 | Nelson | |
| 5,779,566 A | 7/1998 | Wilens | 473/407 |
| 5,797,136 A | 8/1998 | Boyer et al. | 707/2 |
| 5,819,225 A | 10/1998 | Eastwood et al. | 704/275 |
| 5,826,261 A | 10/1998 | Spencer | |
| 5,832,504 A | 11/1998 | Tripathi et al. | 715/235 |
| 5,838,313 A | 11/1998 | Hou et al. | 715/201 |

(Continued)

FOREIGN PATENT DOCUMENTS

| | | | | |
|---|---|---|---|---|
| EP | 1128299 A1 | 8/2001 | | G06F 17/60 |
| EP | 1050829 A2 | 3/2006 | | G06F 17/30 |

(Continued)

OTHER PUBLICATIONS

Rutledge, Patrice-Anne et al., "Special Editiion Using Microsoft Office PowerPoint 2003"; Sep. 13, 2003; Que; pp. 115-117 & 127-128.*

(Continued)

*Primary Examiner* — Scott Baderman
*Assistant Examiner* — Asher Kells
(74) *Attorney, Agent, or Firm* — Thomas Wong; Jim Ross; Micky Minhas

(57) ABSTRACT

Scorecard data including scorecard views, and the like are exported to a presentation application for generating a presentation based on the scorecard data. Briefing book definitions are generated based on the scorecard data, default parameters and user-defined parameters for providing a user selections for the presentations. Using composite objects, scorecard and report views may be reformatted, resized, laid out, and paginated according to the presentation preferences. Once the user selections are received the presentation may be rendered generating charts based on the data, grouping and breaking down views, incorporating unstructured data, and the like.

15 Claims, 13 Drawing Sheets

(56) References Cited

U.S. PATENT DOCUMENTS

| | | | |
|---|---|---|---|
| 5,845,270 A | 12/1998 | Schatz | 706/11 |
| 5,877,758 A | 3/1999 | Seybold | 715/866 |
| 5,911,143 A | 6/1999 | Deinhart et al. | 1/1 |
| 5,926,794 A | 7/1999 | Fethe | 705/11 |
| 5,941,947 A | 8/1999 | Brown et al. | 709/225 |
| 5,943,666 A | 8/1999 | Kleewein et al. | 1/1 |
| 5,956,691 A | 9/1999 | Powers | 705/4 |
| 6,012,044 A | 1/2000 | Maggioncalda et al. | 705/36 R |
| 6,023,714 A | 2/2000 | Hill et al. | 715/235 |
| 6,061,692 A | 5/2000 | Thomas et al. | 707/613 |
| 6,097,802 A | 8/2000 | Fleischer et al. | |
| 6,115,705 A | 9/2000 | Larson | 1/1 |
| 6,119,137 A | 9/2000 | Smith et al. | 715/234 |
| 6,141,655 A | 10/2000 | Johnson | 707/2 |
| 6,163,779 A | 12/2000 | Mantha | 707/100 |
| 6,182,022 B1 | 1/2001 | Mayle et al. | 702/182 |
| 6,216,066 B1 | 4/2001 | Goebel et al. | 701/29 |
| 6,226,635 B1 | 5/2001 | Katariya | 1/1 |
| 6,230,310 B1 | 5/2001 | Arrouye et al. | 717/136 |
| 6,233,573 B1 | 5/2001 | Bair | 707/3 |
| 6,249,784 B1 | 6/2001 | Macke | 707/3 |
| 6,308,206 B1 | 10/2001 | Singh | 709/223 |
| 6,321,206 B1 | 11/2001 | Honarvar | 705/7 |
| 6,322,366 B1 | 11/2001 | Bergan et al. | |
| 6,332,163 B1 | 12/2001 | Bowman-Amuah | |
| 6,341,277 B1 | 1/2002 | Coden et al. | 1/1 |
| 6,389,434 B1 | 5/2002 | Rivette | 715/512 |
| 6,393,406 B1 | 5/2002 | Eder | 705/7 |
| 6,421,670 B1 | 7/2002 | Fourman | 707/10 |
| 6,435,279 B1 | 8/2002 | Howe et al. | 715/202 |
| 6,463,431 B1 | 10/2002 | Schmitt | 1/1 |
| 6,466,935 B1 | 10/2002 | Stuart | 1/1 |
| 6,490,589 B1 | 12/2002 | Weider et al. | |
| 6,493,733 B1 | 12/2002 | Pollack | 715/513 |
| 6,516,324 B1 | 2/2003 | Jones | 707/104.1 |
| 6,519,603 B1 | 2/2003 | Bays | 707/102 |
| 6,522,342 B1 | 2/2003 | Gagnon et al. | 715/716 |
| 6,529,215 B2 | 3/2003 | Golovchinsky et al. | 715/764 |
| 6,563,514 B1 | 5/2003 | Samar | 715/711 |
| 6,578,004 B1 | 6/2003 | Cimral | 705/7 |
| 6,601,233 B1 | 7/2003 | Underwood | 717/102 |
| 6,604,084 B1 | 8/2003 | Powers et al. | 705/11 |
| 6,606,627 B1 | 8/2003 | Guthrie et al. | 1/1 |
| 6,628,312 B1 | 9/2003 | Rao | 715/853 |
| 6,633,889 B2 | 10/2003 | Dessloch et al. | 1/1 |
| 6,658,432 B1 | 12/2003 | Alavi et al. | 707/104.1 |
| 6,665,577 B2 | 12/2003 | Onyshkevych et al. | 700/130 |
| 6,677,963 B1 | 1/2004 | Mani et al. | 715/764 |
| 6,687,720 B1 | 2/2004 | Colver et al. | |
| 6,687,735 B1 | 2/2004 | Logston et al. | 709/203 |
| 6,687,878 B1 | 2/2004 | Eintracht | 712/512 |
| 6,728,724 B1 | 4/2004 | Megiddo et al. | 1/1 |
| 6,763,134 B2 | 7/2004 | Cooper et al. | 382/162 |
| 6,772,137 B1 | 8/2004 | Hurwood et al. | 707/2 |
| 6,775,675 B1 | 8/2004 | Nwabueze et al. | 707/100 |
| 6,782,421 B1 | 8/2004 | Soles et al. | 709/223 |
| 6,785,675 B1 | 8/2004 | Graves et al. | 1/1 |
| 6,789,046 B1 | 9/2004 | Murstein et al. | |
| 6,804,657 B1 | 10/2004 | Sultan | 705/7.31 |
| 6,831,575 B2 | 12/2004 | Wu et al. | 341/50 |
| 6,831,668 B2 | 12/2004 | Cras | 715/853 |
| 6,842,176 B2 | 1/2005 | Sang'udi | 345/440 |
| 6,850,891 B1 | 2/2005 | Forman | 705/7 |
| 6,854,091 B1 | 2/2005 | Beaudoin | 715/854 |
| 6,859,798 B1 | 2/2005 | Bedell et al. | 706/45 |
| 6,867,764 B2 | 3/2005 | Ludtke | 345/173 |
| 6,868,087 B1 | 3/2005 | Agarwala et al. | 370/412 |
| 6,874,126 B1 | 3/2005 | Lapidous | 715/711 |
| 6,895,383 B2 | 5/2005 | Heinrich | |
| 6,898,603 B1 | 5/2005 | Petculescu | 707/101 |
| 6,900,808 B2 | 5/2005 | Lassiter | 345/440 |
| 6,901,426 B1 | 5/2005 | Powers et al. | 709/203 |
| 6,917,921 B1 | 7/2005 | Cimral et al. | 705/7 |
| 6,959,306 B2 | 10/2005 | Nwabueze | 707/104.1 |
| 6,963,826 B2 | 11/2005 | Hanaman et al. | 703/2 |
| 6,968,312 B1 | 11/2005 | Jordan | 705/7 |
| 6,973,616 B1 | 12/2005 | Cottrille | 715/512 |
| 6,976,086 B2 | 12/2005 | Sadeghi et al. | 709/236 |
| 6,981,252 B1 | 12/2005 | Sadowsky | |
| 6,988,076 B2 | 1/2006 | Ouimet | 705/7 |
| 6,995,768 B2 | 2/2006 | Jou | 345/440 |
| 7,013,285 B2 | 3/2006 | Rebane | 705/10 |
| 7,015,911 B2 | 3/2006 | Shaughnessy et al. | 345/440 |
| 7,027,051 B2 | 4/2006 | Alford et al. | 345/440 |
| 7,043,524 B2 | 5/2006 | Shah et al. | 709/203 |
| 7,058,638 B2 | 6/2006 | Singh | 707/100 |
| 7,065,784 B2 | 6/2006 | Hopmann et al. | 726/4 |
| 7,079,010 B2 | 7/2006 | Champlin | 340/286.02 |
| 7,158,628 B2 | 1/2007 | McConnell et al. | 379/265.02 |
| 7,181,417 B1 | 2/2007 | Langseth et al. | 705/26 |
| 7,200,595 B2 | 4/2007 | Dutta et al. | 1/1 |
| 7,216,116 B1 | 5/2007 | Nilsson et al. | 1/1 |
| 7,222,308 B2 | 5/2007 | Sauermann et al. | 715/833 |
| 7,224,847 B2 | 5/2007 | Zhang et al. | |
| 7,233,908 B1 | 6/2007 | Nelson | |
| 7,249,120 B2 | 7/2007 | Bruno et al. | 1/1 |
| 7,275,024 B2 | 9/2007 | Yeh et al. | 703/2 |
| 7,302,421 B2 | 11/2007 | Aldridge | 1/1 |
| 7,302,431 B1 | 11/2007 | Apollonsky et al. | 1/1 |
| 7,302,444 B1 | 11/2007 | Dunmore et al. | 1/1 |
| 7,313,561 B2 | 12/2007 | Lo et al. | 1/1 |
| 7,340,448 B2 | 3/2008 | Santosuosso | 1/1 |
| 7,349,862 B2 | 3/2008 | Palmer et al. | 705/7 |
| 7,349,877 B2 | 3/2008 | Ballow et al. | 705/36 R |
| 7,359,865 B1 | 4/2008 | Connor et al. | 705/10 |
| 7,383,247 B2 | 6/2008 | Li et al. | 1/1 |
| 7,398,240 B2 | 7/2008 | Ballow et al. | 705/35 |
| 7,406,431 B2 | 7/2008 | Spira et al. | 705/7 |
| 7,409,357 B2 | 8/2008 | Schaf et al. | 705/7 |
| 7,412,398 B1 | 8/2008 | Bailey | 705/10 |
| 7,433,876 B2 | 10/2008 | Spivack et al. | 1/1 |
| 7,440,976 B2 | 10/2008 | Hart et al. | 707/203 |
| 7,454,393 B2 | 11/2008 | Horvitz et al. | 706/46 |
| 7,496,852 B2 | 2/2009 | Eichorn et al. | 715/764 |
| 7,496,857 B2 | 2/2009 | Stata et al. | 715/833 |
| 7,509,343 B1 | 3/2009 | Washburn et al. | 707/104.1 |
| 7,523,466 B2 | 4/2009 | DeAngelis | |
| 7,546,226 B1 | 6/2009 | Yeh et al. | 703/2 |
| 7,546,246 B1 | 6/2009 | Stamm et al. | 705/7 |
| 7,546,549 B2 | 6/2009 | Danas et al. | |
| 7,548,912 B2 | 6/2009 | Gideoni et al. | 1/1 |
| 7,559,023 B2 | 7/2009 | Hays et al. | 715/255 |
| 7,568,217 B1 | 7/2009 | Prasad et al. | 726/3 |
| 7,587,665 B2 | 9/2009 | Crow et al. | 715/212 |
| 7,587,755 B2 * | 9/2009 | Kramer | 726/4 |
| 7,599,848 B2 | 10/2009 | Wefers et al. | 705/7 |
| 7,613,625 B2 | 11/2009 | Heinrich | 705/7 |
| 7,617,177 B2 | 11/2009 | Bukary et al. | 1/1 |
| 7,617,187 B2 | 11/2009 | Zhu et al. | 715/243 |
| 7,630,965 B1 | 12/2009 | Erickson et al. | 1/1 |
| 7,634,478 B2 | 12/2009 | Yang et al. | 1/1 |
| 7,636,709 B1 | 12/2009 | Srikant et al. | |
| 7,640,506 B2 | 12/2009 | Pratley et al. | 715/751 |
| 7,660,731 B2 | 2/2010 | Chaddha et al. | 705/8 |
| 7,667,582 B1 | 2/2010 | Waldorf | 340/440 |
| 7,685,207 B1 | 3/2010 | Helms | 707/790 |
| 7,694,270 B2 | 4/2010 | Manikotia et al. | 717/101 |
| 7,698,349 B2 | 4/2010 | Hulen et al. | 707/805 |
| 7,702,554 B2 | 4/2010 | Ballow et al. | 705/35 |
| 7,702,779 B1 | 4/2010 | Gupta et al. | 709/224 |
| 7,707,490 B2 | 4/2010 | Hays et al. | 715/234 |
| 7,716,253 B2 * | 5/2010 | Netz et al. | 707/803 |
| 7,716,278 B2 | 5/2010 | Beringer et al. | 709/203 |
| 7,716,571 B2 | 5/2010 | Tien et al. | 715/212 |
| 7,716,592 B2 | 5/2010 | Tien et al. | 715/744 |
| 7,725,947 B2 | 5/2010 | Bukary et al. | 726/30 |
| 7,730,023 B2 * | 6/2010 | MacGregor | 707/603 |
| 7,730,123 B1 | 6/2010 | Erickson et al. | 709/203 |
| 7,730,129 B2 | 6/2010 | Wang et al. | |
| 7,739,148 B2 | 6/2010 | Suzuki et al. | 705/26 |
| 7,747,572 B2 | 6/2010 | Scott et al. | 707/636 |
| 7,752,094 B2 | 7/2010 | Davidson et al. | 705/31 |
| 7,752,301 B1 | 7/2010 | Maiocco et al. | 709/224 |
| 7,778,910 B2 | 8/2010 | Ballow et al. | 705/36 R |

(56) References Cited

U.S. PATENT DOCUMENTS

| | | |
|---|---|---|
| 7,788,280 B2 | 8/2010 | Singh et al. .................... 707/791 |
| 7,792,774 B2 | 9/2010 | Friedlander et al. ............ 706/47 |
| 7,822,662 B2 | 10/2010 | Guzik et al. .................... 705/35 |
| 7,831,464 B1* | 11/2010 | Nichols et al. ................. 705/7.39 |
| 7,840,896 B2 | 11/2010 | Tien et al. ..................... 715/243 |
| 7,848,947 B1 | 12/2010 | McGloin et al. |
| 7,899,833 B2 | 3/2011 | Stevens et al. |
| 7,899,843 B2 | 3/2011 | Dettinger et al. |
| 7,904,797 B2 | 3/2011 | Wong et al. |
| 7,953,626 B2 | 5/2011 | Wright et al. |
| 8,010,324 B1 | 8/2011 | Crowe et al. |
| 8,095,499 B2 | 1/2012 | Thanu |
| 8,126,750 B2 | 2/2012 | Tien et al. |
| 8,190,992 B2 | 5/2012 | Tien et al. |
| 8,261,181 B2 | 9/2012 | Tien et al. |
| 8,280,822 B2 | 10/2012 | McKeown et al. |
| 8,321,805 B2 | 11/2012 | Tien et al. |
| 8,495,663 B2 | 7/2013 | Tien et al. |
| 2001/0004256 A1 | 6/2001 | Iwata et al. .................... 345/204 |
| 2001/0051835 A1 | 12/2001 | Cline .............................. 700/91 |
| 2001/0054046 A1 | 12/2001 | Mikhailov et al. ............ 707/500 |
| 2002/0029273 A1 | 3/2002 | Haroldson et al. ............ 709/204 |
| 2002/0038217 A1 | 3/2002 | Young ............................. 705/1 |
| 2002/0049621 A1 | 4/2002 | Bruce ............................. 705/7 |
| 2002/0052740 A1 | 5/2002 | Charlesworth ............... 704/220 |
| 2002/0052862 A1 | 5/2002 | Scott et al. ....................... 707/1 |
| 2002/0059267 A1 | 5/2002 | Shah ............................. 707/100 |
| 2002/0078175 A1 | 6/2002 | Wallace ........................ 709/200 |
| 2002/0087272 A1 | 7/2002 | Mackie .......................... 702/14 |
| 2002/0091737 A1 | 7/2002 | Markel ......................... 715/234 |
| 2002/0099578 A1 | 7/2002 | Eicher et al. .................... 705/7 |
| 2002/0099678 A1 | 7/2002 | Albright et al. ............... 706/45 |
| 2002/0103976 A1 | 8/2002 | Steely et al. .................. 711/135 |
| 2002/0112171 A1 | 8/2002 | Ginter et al. .................. 713/185 |
| 2002/0133368 A1 | 9/2002 | Strutt et al. ...................... 705/1 |
| 2002/0138659 A1 | 9/2002 | Trabaris et al. |
| 2002/0147803 A1 | 10/2002 | Dodd et al. .................... 709/223 |
| 2002/0161595 A1 | 10/2002 | Cepeda |
| 2002/0161614 A1 | 10/2002 | Spira et al. ..................... 705/7 |
| 2002/0169658 A1 | 11/2002 | Adler ........................... 705/10 |
| 2002/0169799 A1 | 11/2002 | Voshell ........................ 707/503 |
| 2002/0177784 A1 | 11/2002 | Shekhar ....................... 600/519 |
| 2002/0178119 A1 | 11/2002 | Griffin et al. .................. 705/54 |
| 2002/0184043 A1 | 12/2002 | Lavorgna et al. ............... 705/1 |
| 2002/0184061 A1 | 12/2002 | Digate et al. .................... 705/7 |
| 2002/0188513 A1 | 12/2002 | Gil et al. ...................... 705/22 |
| 2002/0194042 A1 | 12/2002 | Sands ............................. 705/7 |
| 2002/0194090 A1 | 12/2002 | Gagnon et al. ................ 705/27 |
| 2002/0194329 A1 | 12/2002 | Alling ........................... 709/224 |
| 2002/0198985 A1 | 12/2002 | Fraenkel et al. .............. 709/224 |
| 2003/0004742 A1 | 1/2003 | Palmer et al. .................... 705/1 |
| 2003/0009373 A1 | 1/2003 | Ensing et al. |
| 2003/0009649 A1 | 1/2003 | Martin et al. |
| 2003/0014290 A1 | 1/2003 | McLean et al. ................. 705/7 |
| 2003/0014488 A1 | 1/2003 | Dalal et al. .................... 709/204 |
| 2003/0028419 A1 | 2/2003 | Monaghan ..................... 705/10 |
| 2003/0033191 A1 | 2/2003 | Davies et al. ................. 705/10 |
| 2003/0040936 A1 | 2/2003 | Nader et al. ..................... 705/1 |
| 2003/0055731 A1 | 3/2003 | Fouraker et al. .............. 705/22 |
| 2003/0055927 A1 | 3/2003 | Fischer et al. ................ 709/221 |
| 2003/0061132 A1 | 3/2003 | Yu et al. ........................ 705/30 |
| 2003/0061212 A1 | 3/2003 | Smith et al. |
| 2003/0065604 A1 | 4/2003 | Gatto ............................ 705/36 |
| 2003/0065605 A1 | 4/2003 | Gatto ............................ 705/36 |
| 2003/0069773 A1 | 4/2003 | Hladik et al. .................... 705/7 |
| 2003/0069824 A1 | 4/2003 | Menninger .................... 705/37 |
| 2003/0071814 A1* | 4/2003 | Jou et al. ...................... 345/440 |
| 2003/0078830 A1 | 4/2003 | Wagner et al. |
| 2003/0093423 A1 | 5/2003 | Larason et al. ................. 707/5 |
| 2003/0110249 A1* | 6/2003 | Buus et al. .................... 709/224 |
| 2003/0144868 A1 | 7/2003 | MacIntyre et al. ............. 705/1 |
| 2003/0146937 A1 | 8/2003 | Lee .............................. 345/781 |
| 2003/0149696 A1* | 8/2003 | Nelson et al. ................. 707/10 |
| 2003/0182181 A1 | 9/2003 | Kirkwood ..................... 705/11 |
| 2003/0187675 A1 | 10/2003 | Hack .............................. 705/1 |
| 2003/0195878 A1 | 10/2003 | Neumann ...................... 707/3 |
| 2003/0204430 A1 | 10/2003 | Kalmick et al. ................ 705/8 |
| 2003/0204487 A1 | 10/2003 | Sssv .............................. 707/1 |
| 2003/0212960 A1 | 11/2003 | Shaughnessy et al. ........ 715/526 |
| 2003/0220830 A1 | 11/2003 | Myr |
| 2003/0225604 A1 | 12/2003 | Casati et al. .................... 705/7 |
| 2003/0226107 A1 | 12/2003 | Pelegri-Llopart et al. .. 707/501.1 |
| 2003/0236732 A1 | 12/2003 | Cimral et al. ................. 705/36 |
| 2004/0021695 A1 | 2/2004 | Sauermann et al. ........... 345/789 |
| 2004/0030741 A1 | 2/2004 | Wolton et al. ................. 709/202 |
| 2004/0030795 A1 | 2/2004 | Hesmer et al. ................ 709/231 |
| 2004/0033475 A1 | 2/2004 | Mizuma et al. ............... 434/219 |
| 2004/0044665 A1 | 3/2004 | Nwabueze ...................... 707/9 |
| 2004/0044678 A1 | 3/2004 | Kalia et al. ................... 707/102 |
| 2004/0059518 A1 | 3/2004 | Rothschild .................... 702/18 |
| 2004/0064293 A1 | 4/2004 | Hamilton et al. ............. 702/182 |
| 2004/0066782 A1 | 4/2004 | Nassar .......................... 370/389 |
| 2004/0068429 A1 | 4/2004 | MacDonald ................... 705/10 |
| 2004/0068431 A1 | 4/2004 | Smith et al. .................... 705/10 |
| 2004/0073549 A1 | 4/2004 | Turkel et al. |
| 2004/0078395 A1 | 4/2004 | Rinkevich et al. |
| 2004/0083246 A1 | 4/2004 | Kahlouche et al. ........... 708/105 |
| 2004/0093296 A1 | 5/2004 | Phelan et al. ................ 705/36 R |
| 2004/0102926 A1 | 5/2004 | Adendorff .................... 702/182 |
| 2004/0117731 A1 | 6/2004 | Blyashov ..................... 715/507 |
| 2004/0119752 A1 | 6/2004 | Berringer et al. ............. 345/779 |
| 2004/0128150 A1 | 7/2004 | Lundegren ...................... 705/1 |
| 2004/0135826 A1 | 7/2004 | Pickering ..................... 345/860 |
| 2004/0138944 A1 | 7/2004 | Whitacre ...................... 705/11 |
| 2004/0162772 A1 | 8/2004 | Lewis .......................... 705/34 |
| 2004/0164983 A1 | 8/2004 | Khozai ........................ 345/440 |
| 2004/0172323 A1 | 9/2004 | Stamm ......................... 705/10 |
| 2004/0183800 A1 | 9/2004 | Peterson ...................... 345/440 |
| 2004/0186765 A1 | 9/2004 | Kataoka |
| 2004/0199541 A1 | 10/2004 | Goldberg et al. ........... 707/104.1 |
| 2004/0204913 A1 | 10/2004 | Mueller et al. ............... 702/188 |
| 2004/0210574 A1 | 10/2004 | Aponte et al. .................. 707/5 |
| 2004/0212636 A1 | 10/2004 | Stata et al. .................... 345/703 |
| 2004/0215626 A1 | 10/2004 | Colossi et al. ............... 715/500 |
| 2004/0225571 A1 | 11/2004 | Urali ............................ 705/26 |
| 2004/0225955 A1 | 11/2004 | Ly ................................ 715/500 |
| 2004/0230463 A1 | 11/2004 | Boivin ........................... 705/7 |
| 2004/0230471 A1 | 11/2004 | Putnam ........................ 705/10 |
| 2004/0249482 A1 | 12/2004 | Abu El Ata et al. ........... 700/44 |
| 2004/0249657 A1 | 12/2004 | Kol et al. ....................... 705/1 |
| 2004/0252134 A1 | 12/2004 | Bhatt et al. ................... 345/619 |
| 2004/0254806 A1 | 12/2004 | Schwerin-Wenzel et al. .... 705/1 |
| 2004/0254860 A1 | 12/2004 | Wagner et al. ................ 705/27 |
| 2004/0260582 A1 | 12/2004 | King .............................. 705/7 |
| 2004/0260717 A1 | 12/2004 | Albornoz et al. ............ 707/102 |
| 2004/0268228 A1 | 12/2004 | Croney et al. ................ 715/255 |
| 2005/0004781 A1 | 1/2005 | Price et al. .................... 702/188 |
| 2005/0010456 A1 | 1/2005 | Chang et al. |
| 2005/0012743 A1 | 1/2005 | Kapler et al. ................. 345/419 |
| 2005/0015732 A1 | 1/2005 | Vedula et al. |
| 2005/0039119 A1 | 2/2005 | Parks et al. .................. 715/515 |
| 2005/0041872 A1* | 2/2005 | Yim et al. ..................... 382/232 |
| 2005/0049831 A1 | 3/2005 | Lilly ............................ 702/182 |
| 2005/0049894 A1 | 3/2005 | Cantwell et al. ............... 705/1 |
| 2005/0055257 A1 | 3/2005 | Senturk et al. .................. 705/8 |
| 2005/0060048 A1 | 3/2005 | Pierre ........................... 700/28 |
| 2005/0060300 A1 | 3/2005 | Stolte et al. |
| 2005/0060325 A1 | 3/2005 | Bakalash ...................... 707/100 |
| 2005/0065811 A1 | 3/2005 | Chu et al. |
| 2005/0065925 A1 | 3/2005 | Weissman et al. ............. 707/4 |
| 2005/0065930 A1 | 3/2005 | Swaminathan et al. |
| 2005/0065967 A1 | 3/2005 | Schuetze et al. ............ 707/102 |
| 2005/0065977 A1 | 3/2005 | Benson et al. |
| 2005/0071680 A1 | 3/2005 | Bukary et al. ................ 713/201 |
| 2005/0071737 A1* | 3/2005 | Adendorff et al. ........... 715/500 |
| 2005/0091093 A1 | 4/2005 | Bhaskaran ...................... 705/7 |
| 2005/0091253 A1 | 4/2005 | Cragun ........................ 707/102 |
| 2005/0091263 A1 | 4/2005 | Wallace ....................... 707/102 |
| 2005/0096950 A1 | 5/2005 | Caplan et al. |
| 2005/0097438 A1 | 5/2005 | Jacobson .................... 715/500.1 |
| 2005/0097517 A1 | 5/2005 | Goin et al. .................... 717/124 |
| 2005/0108271 A1 | 5/2005 | Hurmiz et al. ............... 707/102 |
| 2005/0114241 A1 | 5/2005 | Hirsch .......................... 705/35 |
| 2005/0114801 A1 | 5/2005 | Yang ............................ 715/961 |

(56) References Cited

U.S. PATENT DOCUMENTS

| | | | |
|---|---|---|---|
| 2005/0144022 A1* | 6/2005 | Evans | 705/1 |
| 2005/0144108 A1 | 6/2005 | Loeper | |
| 2005/0149558 A1 | 7/2005 | Zhuk | 707/104.1 |
| 2005/0149852 A1 | 7/2005 | Bleicher | 715/501.1 |
| 2005/0154628 A1 | 7/2005 | Eckart et al. | 705/10 |
| 2005/0154635 A1 | 7/2005 | Wright et al. | 705/11 |
| 2005/0154769 A1 | 7/2005 | Eckart et al. | 707/201 |
| 2005/0160356 A1 | 7/2005 | Albornoz | 715/512 |
| 2005/0171835 A1 | 8/2005 | Mook | 705/11 |
| 2005/0181835 A1 | 8/2005 | Lau et al. | 455/567 |
| 2005/0197946 A1 | 9/2005 | Williams et al. | 705/36 |
| 2005/0198042 A1 | 9/2005 | Davis | 707/10 |
| 2005/0203876 A1 | 9/2005 | Cragun et al. | 707/3 |
| 2005/0209943 A1 | 9/2005 | Ballow et al. | 705/35 |
| 2005/0209945 A1 | 9/2005 | Ballow et al. | 705/35 |
| 2005/0209946 A1 | 9/2005 | Ballow et al. | 705/35 |
| 2005/0209948 A1 | 9/2005 | Ballow et al. | 705/35 |
| 2005/0210052 A1 | 9/2005 | Aldridge | 707/101 |
| 2005/0216831 A1* | 9/2005 | Guzik et al. | 715/513 |
| 2005/0223021 A1 | 10/2005 | Batra et al. | |
| 2005/0228880 A1 | 10/2005 | Champlin | 709/224 |
| 2005/0240467 A1 | 10/2005 | Eckart | 705/10 |
| 2005/0240898 A1 | 10/2005 | Manikotia et al. | 717/101 |
| 2005/0251432 A1 | 11/2005 | Barker et al. | |
| 2005/0253874 A1 | 11/2005 | Lal et al. | |
| 2005/0256825 A1 | 11/2005 | Dettinger | 707/1 |
| 2005/0262051 A1 | 11/2005 | Dettinger et al. | 707/3 |
| 2005/0262451 A1 | 11/2005 | Remignanti et al. | 715/833 |
| 2005/0272022 A1 | 12/2005 | Montz, Jr. et al. | 434/322 |
| 2005/0273762 A1 | 12/2005 | Lesh | 715/115 |
| 2005/0283393 A1 | 12/2005 | White et al. | |
| 2005/0289452 A1 | 12/2005 | Kashi | 715/512 |
| 2006/0004555 A1 | 1/2006 | Jones | 703/6 |
| 2006/0004731 A1 | 1/2006 | Seibel et al. | 707/3 |
| 2006/0009990 A1 | 1/2006 | McCormick | 705/1 |
| 2006/0010032 A1 | 1/2006 | Eicher et al. | 705/10 |
| 2006/0010164 A1 | 1/2006 | Netz et al. | 707/104.1 |
| 2006/0015424 A1 | 1/2006 | Esposito et al. | |
| 2006/0020531 A1 | 1/2006 | Veeneman et al. | 705/35 |
| 2006/0026179 A1 | 2/2006 | Brown et al. | 707/100 |
| 2006/0036455 A1 | 2/2006 | Prasad | 715/1 |
| 2006/0036595 A1 | 2/2006 | Gilfix et al. | 707/5 |
| 2006/0047419 A1 | 3/2006 | Diendorf et al. | 701/208 |
| 2006/0047711 A1 | 3/2006 | Cho et al. | |
| 2006/0053103 A1 | 3/2006 | Chaudhuri et al. | |
| 2006/0059107 A1 | 3/2006 | Elmore et al. | 705/64 |
| 2006/0074789 A1 | 4/2006 | Capotosto et al. | 705/35 |
| 2006/0080156 A1 | 4/2006 | Baughn et al. | 705/7 |
| 2006/0085444 A1 | 4/2006 | Sarawgi et al. | 707/100 |
| 2006/0085445 A1 | 4/2006 | Thanu | |
| 2006/0089868 A1 | 4/2006 | Griller et al. | 705/10 |
| 2006/0089894 A1 | 4/2006 | Balk et al. | 705/35 |
| 2006/0089939 A1 | 4/2006 | Broda et al. | 707/100 |
| 2006/0095276 A1 | 5/2006 | Axelrod et al. | 705/1 |
| 2006/0095915 A1 | 5/2006 | Clater | 718/100 |
| 2006/0111921 A1 | 5/2006 | Chang et al. | 705/1 |
| 2006/0112123 A1 | 5/2006 | Clark et al. | 707/101 |
| 2006/0112130 A1 | 5/2006 | Lowson | 707/102 |
| 2006/0123022 A1 | 6/2006 | Bird | 707/100 |
| 2006/0136830 A1 | 6/2006 | Martlage et al. | 715/745 |
| 2006/0154692 A1 | 7/2006 | Ikehara et al. | 455/556.2 |
| 2006/0161471 A1 | 7/2006 | Hulen et al. | 705/10 |
| 2006/0161596 A1 | 7/2006 | Chan et al. | 707/201 |
| 2006/0167704 A1 | 7/2006 | Nicholls et al. | 705/1 |
| 2006/0178897 A1 | 8/2006 | Fuchs | 705/1 |
| 2006/0178920 A1 | 8/2006 | Muell | 705/8 |
| 2006/0184416 A1 | 8/2006 | Nag | |
| 2006/0195424 A1 | 8/2006 | Wiest et al. | 707/3 |
| 2006/0206392 A1 | 9/2006 | Rice, Jr. et al. | 705/26 |
| 2006/0212429 A1 | 9/2006 | Bruno et al. | |
| 2006/0224325 A1 | 10/2006 | Conway et al. | 702/19 |
| 2006/0229925 A1 | 10/2006 | Chalasani et al. | 705/8 |
| 2006/0230234 A1 | 10/2006 | Bentolila et al. | 711/133 |
| 2006/0233348 A1 | 10/2006 | Cooper | 379/265.06 |
| 2006/0235732 A1 | 10/2006 | Miller et al. | 705/7 |
| 2006/0235778 A1 | 10/2006 | Razvi et al. | 705/35 |
| 2006/0253475 A1 | 11/2006 | Stewart et al. | 707/100 |
| 2006/0259338 A1 | 11/2006 | Rodrigue et al. | 705/7 |
| 2006/0265377 A1 | 11/2006 | Raman et al. | 707/9 |
| 2006/0271583 A1 | 11/2006 | Hulen et al. | 707/102 |
| 2006/0277128 A1 | 12/2006 | Anandarao et al. | |
| 2006/0282819 A1 | 12/2006 | Graham et al. | 717/113 |
| 2006/0288211 A1 | 12/2006 | Vargas et al. | 713/170 |
| 2007/0021992 A1 | 1/2007 | Konakalla | 705/7 |
| 2007/0022026 A1 | 1/2007 | Davidson et al. | 705/31 |
| 2007/0033129 A1 | 2/2007 | Coates | 705/36 R |
| 2007/0038934 A1 | 2/2007 | Fellman | 715/700 |
| 2007/0050237 A1 | 3/2007 | Tien et al. | 705/11 |
| 2007/0055564 A1 | 3/2007 | Fourman | 705/11 |
| 2007/0055688 A1 | 3/2007 | Blattner | 707/102 |
| 2007/0067381 A1 | 3/2007 | Grant et al. | 709/200 |
| 2007/0112607 A1 | 5/2007 | Tien et al. | 705/7 |
| 2007/0112727 A1 | 5/2007 | Jardine et al. | |
| 2007/0143161 A1 | 6/2007 | Tien et al. | 705/7 |
| 2007/0143174 A1 | 6/2007 | Tien et al. | 705/11 |
| 2007/0143175 A1 | 6/2007 | Tien et al. | 705/11 |
| 2007/0156680 A1 | 7/2007 | Tien et al. | 707/6 |
| 2007/0162500 A1 | 7/2007 | Herwadkar | |
| 2007/0168323 A1 | 7/2007 | Dickerman et al. | 707/2 |
| 2007/0174330 A1 | 7/2007 | Fox et al. | 707/102 |
| 2007/0192170 A1 | 8/2007 | Cristol | |
| 2007/0225986 A1 | 9/2007 | Bowe et al. | 705/1 |
| 2007/0234198 A1 | 10/2007 | Tien et al. | 715/512 |
| 2007/0239508 A1 | 10/2007 | Fazal et al. | 705/8 |
| 2007/0239573 A1 | 10/2007 | Tien et al. | 705/35 |
| 2007/0239660 A1 | 10/2007 | Tien et al. | 707/2 |
| 2007/0254740 A1 | 11/2007 | Tien et al. | 463/42 |
| 2007/0255681 A1 | 11/2007 | Tien et al. | 707/2 |
| 2007/0260625 A1 | 11/2007 | Tien et al. | 707/101 |
| 2007/0265863 A1 | 11/2007 | Tien et al. | 705/1 |
| 2007/0266042 A1 | 11/2007 | Hsu et al. | 707/102 |
| 2007/0282673 A1 | 12/2007 | Nagpal et al. | 705/11 |
| 2008/0005064 A1 | 1/2008 | Sarukkai | 707/3 |
| 2008/0040309 A1 | 2/2008 | Aldridge | 707/1 |
| 2008/0059441 A1 | 3/2008 | Gaug et al. | 707/4 |
| 2008/0066010 A1 | 3/2008 | Brodersen et al. | |
| 2008/0086345 A1 | 4/2008 | Wilson et al. | 705/7 |
| 2008/0086359 A1 | 4/2008 | Holton et al. | 705/10 |
| 2008/0109270 A1 | 5/2008 | Shepherd et al. | 705/7 |
| 2008/0115103 A1 | 5/2008 | Datars et al. | 717/101 |
| 2008/0140623 A1 | 6/2008 | Tien et al. | 707/3 |
| 2008/0162209 A1 | 7/2008 | Gu et al. | 705/7 |
| 2008/0162210 A1 | 7/2008 | Gu et al. | 705/7 |
| 2008/0163066 A1 | 7/2008 | Gu et al. | 715/738 |
| 2008/0163099 A1 | 7/2008 | Gu et al. | 715/780 |
| 2008/0163125 A1 | 7/2008 | Gu et al. | 715/853 |
| 2008/0163164 A1 | 7/2008 | Chowdhary et al. | 717/106 |
| 2008/0168376 A1 | 7/2008 | Tien et al. | 715/772 |
| 2008/0172287 A1 | 7/2008 | Tien et al. | 705/10 |
| 2008/0172348 A1 | 7/2008 | Tien et al. | 706/12 |
| 2008/0172414 A1 | 7/2008 | Tien et al. | 707/104.1 |
| 2008/0172629 A1 | 7/2008 | Tien et al. | 715/771 |
| 2008/0183564 A1 | 7/2008 | Tien et al. | 705/11 |
| 2008/0184099 A1 | 7/2008 | Tien et al. | 715/209 |
| 2008/0184130 A1 | 7/2008 | Tien et al. | 715/745 |
| 2008/0189632 A1 | 8/2008 | Tien et al. | 715/764 |
| 2008/0189724 A1 | 8/2008 | Tien et al. | 719/329 |
| 2008/0229214 A1 | 9/2008 | Hamilton et al. | |
| 2008/0243597 A1 | 10/2008 | Ballow et al. | 705/11 |
| 2008/0249824 A1 | 10/2008 | DiBernardino et al. | |
| 2008/0288889 A1 | 11/2008 | Hunt et al. | 705/810 |
| 2009/0276296 A1 | 11/2009 | Spriegel | |
| 2009/0300110 A1 | 12/2009 | Chene et al. | 709/203 |
| 2009/0319344 A1 | 12/2009 | Tepper et al. | |
| 2010/0262659 A1 | 10/2010 | Christiansen et al. | 709/205 |
| 2012/0150905 A1 | 6/2012 | Tien et al. | |
| 2013/0311904 A1 | 11/2013 | Tien et al. | |
| 2014/0129298 A1 | 5/2014 | Hulen et al. | |

FOREIGN PATENT DOCUMENTS

| | | | | |
|---|---|---|---|---|
| WO | WO 97/31320 A1 | 8/1997 | | G06F 17/60 |
| WO | WO 01/65349 A1 | 9/2001 | | G06F 3/00 |
| WO | WO 01/69421 A2 | 9/2001 | | G06F 17/00 |

(56) References Cited

FOREIGN PATENT DOCUMENTS

| WO | WO 01/69421 | A3 | 9/2001 | G06F 17/00 |
|---|---|---|---|---|
| WO | WO 03/037019 | A1 | 5/2003 | H04Q 7/36 |
| WO | WO 01/01206 | A2 | 1/2004 | G05B 13/00 |
| WO | WO 01/01206 | A3 | 1/2004 | G05B 13/00 |
| WO | WO 2004/114177 | A2 | 12/2004 | G06F 17/60 |
| WO | WO 2004/114177 | A3 | 12/2004 | G06F 17/60 |
| WO | WO 2005/062201 | A1 | 7/2005 | |
| WO | WO 2005/072410 | A2 | 8/2005 | |
| WO | WO 2005/101233 | A1 | 10/2005 | G06F 17/21 |

OTHER PUBLICATIONS

U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 7, 2011 in U.S. Appl. No. 11/670,516.
U.S. Official Action mailed Jun. 13, 2011 in U.S. Appl. No. 11/668,520.
U.S. Official Action mailed Jun. 21, 2011 in U.S. Appl. No. 11/408,450.
U.S. Official Action mailed Jun. 24, 2011 in U.S. Appl. No. 11/280,548.
U.S. Official Action mailed Jul. 6, 2011 in U.S. Appl. No. 11/214,678.
U.S. Official Action mailed Jul. 14, 2011 in U.S. Appl. No. 11/668,763.
U.S. Official Action mailed Aug. 8, 2011 in U.S. Appl. No. 11/313,324.
Ergometrics.com Web Pages, Ergometrics, Feb.-Mar. 2000, Retrieved from Archive.org Jan. 25, 2007.
Arnold, Tom, Dashboard & Scorecard Software—Tools for Operations Management and Strategy Deployment, Sep. 18, 2002.
iDashes.net Web Pages, iDashes, Inc., May 2001, Retrieved from Archive.org Jan. 25, 2007.
IBM WebSphere: Chapter 6—Working with WebSphere Business Modeler, cited in U.S. Appl. No. 11/313,390 in OA dated Sep. 1, 2010, 20 pgs.
U.S. Official Action mailed Aug. 4, 2010 in U.S. Appl. No. 11/280,548.
U.S. Official Action mailed Aug. 5, 2010 in U.S. Appl. No. 11/412,458.
U.S. Official Action mailed Aug. 10, 2010 in U.S. Appl. No. 11/623,818.
U.S. Official Action mailed Aug. 30, 2010 in U.S. Appl. No. 11/313,327.
U.S. Official Action mailed Sep. 1, 2010 in U.S. Appl. No. 11/313,390.
U.S. Official Action mailed Sep. 8, 2010 in U.S. Appl. No. 11/670,516.
U.S. Official Action mailed Sep. 9, 2010 in U.S. Appl. No. 11/412,499.
U.S. Official Action mailed Sep. 29, 2010 in U.S. Appl. No. 11/313,324.
U.S. Official Action mailed Oct. 6, 2010 in U.S. Appl. No. 11/313,899.
U.S. Official Action mailed Oct. 12, 2010 in U.S. Appl. No. 11/623,953.
U.S. Official Action mailed Jan. 25, 2011 in U.S. Appl. No. 11/280,548.
U.S. Official Action mailed Feb. 1, 2011 in U.S. Appl. No. 11/670,516.
U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed Apr. 1, 2011 in U.S. Appl. No. 11/313,899.
U.S. Official Action mailed Apr. 4, 2011 in U.S. Appl. No. 11/624,171.
U.S. Official Action mailed Apr. 12, 2011 in U.S. Appl. No. 11/623,953.
U.S. Official Action mailed May 10, 2011 in U.S. Appl. No. 11/393,335.
Acharya, Shared, "Pattern Language for Data Driven Presentation Layer for Dynamic and Configurable Web Systems," Version: Conference Draft, Jul. 26, 2004, pp. 1-33. http://hillside.net/plop/2004/papers/sacharya0/PLoP2004_sacharya0_0.pdf.
"Data Driven Components," Java Developers Journal, SYS-CON Media, Inc. 2004. http://www2.sys-con.com/itsg/virtualcd/Java/archives/0405/hyrkas/index.html.
Chien et al., XML Document Versioning, SIGMOD Record, vol. 30, No. 3, Sep. 2001.
U.S. Official Action mailed Mar. 17, 2010 in U.S. Appl. No. 11/280,548.
U.S. Official Action mailed Mar. 25, 2010 in U.S. Appl. No. 11/393,115.
U.S. Official Action mailed Mar. 30, 2010 in U.S. Appl. No. 11/313,390.
U.S. Official Action mailed Mar. 31, 2010 in U.S. Appl. No. 11/313,327.
U.S. Official Action mailed Apr. 1, 2010 in U.S. Appl. No. 11/313,899.
U.S. Official Action mailed Apr. 7, 2010 in U.S. Appl. No. 11/412,499.
U.S. Official Action mailed Jul. 21, 2010 in U.S. Appl. No. 11/039,714.
U.S. Official Action mailed Jun. 19, 2009 in U.S. Appl. No. 11/408,450.
U.S. Official Action mailed Aug. 6, 2009 in U.S. Appl. No. 11/668,520.
U.S. Official Action mailed Aug. 19, 2009 in U.S. Appl. No. 11/393,115.
U.S. Official Action mailed Sep. 1, 2009 in U.S. Appl. No. 11/412,434.
U.S. Official Action mailed Sep. 2, 2009 in U.S. Appl. No. 11/624,171.
U.S. Official Action mailed Sep. 30, 2009 in U.S. Appl. No. 11/214,678.
Monson et al., "IBM Workplace for Business Controls and Reporting: Administration and Operations Best Practices", IBM Redpaper, Oct. 2005, pp. 1-240.
"Cognos Business Intelligence Series 7, Cognos Impromptu (2006), Mastering Impromptu Reports", Cognos Incorporated, pp. 1-154.
"Cognos Series 7 PowerPlay Transformer", (2003), Installation Guide, Cognos Incorporated, pp. 1-62.
"Cognos Business Intelligence Series Cognos PowerPlay for Windows (2006), Discovering PowerPlay", Cognos Incorporated, pp. 1-74.
"Cognos Business Intelligence Series 7 PowerPlay for Windows", (2006), PowerPlay User Guide, Cognos Incorporated, pp. 1-230.
"Epicor Vantage: Introducing the Next Generation Global Enterprise Resource Planning Software", Epicore Vantage, http://m.scala.com.cn'downloads/vantage/vantage6Oage.pdf, printed Jan. 12, 2006, 60 pgs.
T. E. Graedel et al., "Hierarchical Metrics for Sustainability", Environmental Quality Management, Winter, 2002, vol. 12 Issue 12, pp. 21-30, Retrieved from Business Source Complete Database.
U.S. Official Action mailed Nov. 5, 2010 in U.S. Appl. No. 11/393,335.
U.S. Official Action mailed Nov. 10, 2010 in U.S. Appl. No. 11/624,122.
U.S. Official Action mailed Nov. 10, 2010 in U.S. Appl. No. 11/668,763.
U.S. Official Action mailed Nov. 24, 2010 in U.S. Appl. No. 11/670,444.
U.S. Official Action mailed Nov. 29, 2010 in U.S. Appl. No. 11/668,520.

(56) References Cited

OTHER PUBLICATIONS

U.S. Official Action mailed Dec. 8, 2010 in U.S. Appl. No. 11/214,678.
Kraynak, "Absolute Beginner's Guide to Microsoft Office Excel 2003", Que, Sep. 2003, 32 pp.
John Wiley et al., "Power Point All-in-One Desk Reference for Dummies," Jan. 10, 2007.
U.S. Official Action mailed Oct. 21, 2009 in U.S. Appl. No. 11/280,548.
U.S. Official Action mailed Dec. 8, 2009 in U.S. Appl. No. 11/393,335.
U.S. Official Action mailed Dec. 14, 2009 in U.S. Appl. No. 11/393,019.
U.S. Official Action mailed Dec. 28, 2009 in U.S. Appl. No. 11/624,171.
U.S. Official Action mailed Jan. 15, 2010 in U.S. Appl. No. 11/408,450.
U.S. Official Action mailed Dec. 24, 2008 in U.S. Appl. No. 11/624,171.
"SYSPRO Offers Executive Dashboard with SYSPRO e.net Solutions"; Business Wire, Oct. 11, 2004.
Park et al., Role-Based Access Control on the Web; ACM Transactions on Information and System Security, vol. 4, No. 1, Feb. 2001.
"Microsoft Office Business Scorecard Manager"; Microsoft, 2003.
"Microsoft Takes Up Scorecarding; Performance Management app aims to Maximize Office"; eWeek, Oct. 31, 2005.
Tedeschi, Digital Cockpits are a Faster, Much Closer Way of Tracking Performance in a Corporation's Every Corner; New York Times, Jul. 29, 2002.
Havenstein; "BI Reporting Tools Improve"; InfoWorld, vol. 25, No. 45, Nov. 17, 2003.
U.S. Official Action mailed Jan. 6, 2011 in U.S. Appl. No. 11/313,324.
U.S. Official Action mailed Jan. 11, 2011 in U.S. Appl. No. 11/412,458.
IndicatorBarometer; retrieved from <http://www.aiqsystems.com/docs/ref_7.pdf>, archived Oct. 15, 2004.
U.S. Official Action mailed Jan. 22, 2010 in U.S. Appl. No. 11/039,714.
U.S. Official Action mailed Feb. 3, 2010 in U.S. Appl. No. 11/668,530.
U.S. Office Action dated Feb. 18, 2009 cited in U.S. Appl. No. 11/412,434.
U.S. Official Action mailed May 28, 2009 in U.S. Appl. No. 11/214,678.
"Business Analysis with OLAP", Netways, http://www.netways.com/newsletter.olap.html, printed Mar. 7, 2006, 3 pp.
"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.
"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.
"Cognos 8 Business Intelligence Overview", Cognos Incorporated, http://www.cognos.com/products/cognos8businessintelligence/index.html, printed Jan. 11, 2006, 1 pp.
"CorVu Products", Seabrook, http://www.seabrook.ie/corvu.htm#corvurapidscorecard, printed Mar. 7, 2006, 3 pp.
"Enhanced Vendor Scorecards Vendor Documentation", Publix Super Markets, Inc., copyright 2003, revised date Feb. 9, 2004, http://my.datexx.com/www/customer/p14Vendor%20EVS%20Documentation.pdf, 25 pp.
"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.
"Extend Business Scorecard Manager 2005", ProClarity, http://www.proclarity.com/products/clients_scorecardmanager.asp, printed Jan. 11, 2006, 2 pp.
"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.
"MicroStrategy: Best in Business Intelligence", MicroStrategy Inc., http://www.microstrategy.com/Software/Products/User-Interfaces/Web, printed Jan. 11, 2006, 3 pp.
"OutlookSoft CPM: A Unified Corporate Performance Management Solution", OutlookSoft Corporation, http://www.outlooksoft.com/product.index.htm, printed Jan. 11, 2006, 2 pp.
"SBM Solutions: Product Guide", SBM Associates, http://www.productcosting.com/prodguide.htm, printed Feb. 28, 2006, 1 pp.
"Scorecarding with Cognos® Metrics Manager", Congros, http://www.cognos.com/pdfs/factsheets/fs_scorcarding_with_cognos_metrics_manager.pdf, printed Mar. 7, 2006, 4 pp.
"The Balanced Scorecard", http://cc.msncache.com/cache.aspx?q=2846702033267&lang=en-US&mkt=en-US&FORM=CVRE3, 4 pp.
Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.
Bajwa, Deepinder S. et al., "An Empirical Assessment of the Adoption and Use of Collaboration Information Technologies in the U.S., Australia, and Hong Kong", http://dsslab.sims.monash.edu,au/dss2004/proceedings/pdf/07_Bajwa_Lewis_Pervan_Lai.pdf, printed Jan. 12, 2006, copyright 2004, pp. 60-69.
Bird, Steven et al., "Annotation Graphs as a Framework for Multidimensional Linguistic Data Analysis", http:///ac1.ldc.upenn.educ/W/W99/W99-0301.pdf, printed Jan. 12, 2006, pp. 1-10.
Calame, Paul et al., "Cockpit: Decision Support Tool for Factory Operations and Supply Chain Management", Intel Technology Journal Q1, 2000 Intel Corporation, http://developer.intel.com/technology/itj/q12000/pdfcockpit.pdf, pp. 1-13.
Elmanova, Natalia, "Implementing OLAP in Delphi Applications", http://www.only4gurus.net/miscellaneous/implementing_olap_in_delphi_a.doc, printed Mar. 6, 2006, 19 pp.
Ferguson, Mike, "Conquering Cpm and Business Intelligence", Business Intelligence.com, ITNews265, http://www.businessintelligence.com/ex/asp.code.21/xe/article.htm, printed Jan. 11, 2006, 6 pp.
Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.
Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journa1,827,2337;linkingpublicationresults,1:105633,1, printed Jan. 12, 2006, 2 pp.
Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.
Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.
Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.
"Data Driven Components," Java Developers Journal, SYS-CON Media, Inc. 2004, http://www2.sys-con.com/itsg/virtualcd/Java/archives/0405/hyrkas/index.html, 7 pp.
"Hyperion Intelligence Desktop, Plugin, and HTML Client Products," Hyperion™ Developer Network, http://dev.hyperion.com/resource_library/articles/intelligence_desktop_article.cfm, 7 pp.

(56) References Cited

OTHER PUBLICATIONS

"BusinessObjects Enterprise 6," An End-to-End Overview, White Paper., http://www.spain.businessobjects.com/global/pdf/products/queryanalysis/wp_e6_overview.pdf, 20 pp.
"Cognos 8 Business Intelligence—Dashboards," COGNOS® The Next Level of Performance, http://www.cognos.com/products/cognos8businessintelligence/dashboards.html, 2 pp.
"Microsoft Builds Business Intelligence Into Office Software," Microsoft PressPass—Information for Journalists, http://www.microsoft.com/presspass/press/2005/oct05/10-23BiLalunchPR.mspx, 4 pp.
"Hyperion System 9 BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.
"Products: PilotWorks," Products: PilotWorks—Scorecard, 2006 Pilot Software, pp. 1-3.
"Reveleus Business Analytics," Reveleus, an i-flex businedss, pp. 1-4.
Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp.
"Crystal Xcelsius Workgroup." http://www.xcelsius.com/Products/Enterprise_feastures.html, 3 pp.
"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16.
"BusinessObjects Plan Dashboarding XI for Retail," BusinessObjects, http://www.businessobjects.com/pdf/products/planning/plan_dashboarding_rt.pdf, 2 pp.
"SAS® Risk Intelligence Offerings, Risk Reporting; Data Integration; Internal Risk Ratings; Credit Risk; Market Risk; Operational Risk", htip://www.sas.com/industry/fsi/risk/brochure2.pdf, 12 pp.
Tenhunen, Jarkko; Ukko, Juhani; Markus, Tapio; Rantanen, Hannu; "Applying Balanced Scorecard Principles on the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp.
Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.
Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20-scorecard.pdf, 18 pp.
U.S. Office Action mailed Jul. 25, 2008 cited in U.S. Appl. No. 11/412,434.
U.S. Office Action mailed Sep. 5, 2008 cited in U.S. Appl. No. 11/280,548.
U.S. Office Action dated Nov. 24, 2008 cited in U.S. Appl. No. 11/214,678.
U.S. Official Action mailed May 26, 2010 in U.S. Appl. No. 11/393,335.
U.S. Official Action mailed May 26, 2010 in U.S. Appl. No. 11/668,520.
Cognos Incorporated, "Scorecarding with Cognos Metrics Manager," Oct. 2004.
Charles Bloomfield, "Bringing the Balanced Scorecard to Life: The Microsoft Balanced Scorecard Framework," Microsoft Corporation White Paper, May 2002.
Mulins, Craig S., "Distributed Query Optimization Technical Support", Jul. 1996.
Callen, Daniel J. et al., "Consolidation of Query Results in a Multidatabase Environment: An Object Oriented Approach" IEEE, 1996.
U.S. Official Action mailed Apr. 14, 2010 in U.S. Appl. No. 11/313,324.
U.S. Official Action mailed Apr. 15, 2010 in U.S. Appl. No. 11/412,458.
U.S. Official Action mailed Apr. 23, 2010 in U.S. Appl. No. 11/214,678.
U.S. Official Action mailed May 12, 2010 in U.S. Appl. No. 11/624,171.
U.S. Official Action mailed May 28, 2009 in U.S. Appl. No. 11/280,548.
U.S. Official Action mailed Jun. 3, 2009 in U.S. Appl. No. 11/393,335.
U.S. Official Action mailed Oct. 24, 2011 in U.S. Appl. No. 11/393,335.
U.S. Official Action mailed Nov. 8, 2011 in U.S. Appl. No. 11/670,516.
U.S. Official Action mailed Nov. 9, 2011 in U.S. Appl. No. 11/623,818.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.
U.S. Official Action mailed Apr. 20, 2012 in U.S. Appl. No. 11/412,499.
U.S. Appl. No. 13/404,032, filed Feb. 24, 2012 entitled "Concerted Coordination of Multidimensional Scorecards".
U.S. Official Action mailed Mar. 5, 2012 in U.S. Appl. No. 11/623,953.
U.S. Official Action mailed Oct. 4, 2011 in U.S. Appl. No. 11/624,171.
U.S. Official Action mailed May 31, 2012 in U.S. Appl. No. 11/670,444.
U.S. Official Action mailed Jun. 27, 2012 in U.S. Appl. No. 11/313,899.
MrExcel Consulting, Using Excel to Track Student Grades; Nov. 2006; 6 pgs.
Kraynak, "Absolute Beginner's Guide to Microsoft Excel 2003", Sep. 2003, Appendix A; 4 pgs.
U.S. Official Action mailed Sep. 17, 2012 in U.S. Appl. No. 11/670,516.
U.S. Official Action mailed Oct. 5, 2012 in U.S. Appl. No. 11/623,953.
Junuzovic et al., "Response Time in N-user Replicated, Centralized, and Proximity-Based Hybrid Collaboration Architectures", 2006, 10 pgs.
Oracle Collaboration Suite Metric Reference Manual 10g Release 2 (10.2), Oracle, 2006, pp. 1-544.
Stevens, et al., "Developing a Framework for Integrating Prior Problem Solving and Knowledge Sharing Histories of a Group to Predict Future Group Performance", 2005, 9 pgs.
U.S. Official Action mailed Feb. 26, 2013 in U.S. Appl. No. 11/313,327.
U.S. Official Action mailed Dec. 21, 2012 in U.S. Appl. No. 13/404,032.
Tien et al., U.S. Appl. No. 13/948,306, filed Jul. 23, 2013 entitled "Realtime Collaboration Using Embedded Data Visualizations".
U.S. Official Action mailed Apr. 8, 2013 in U.S. Appl. No. 13/404,032.
U.S. Official Action mailed Apr. 30, 2013 in U.S. Appl. No. 11/039,714.
U.S. Official Action mailed May 17, 2013 in U.S. Appl. No. 11/623,953.
U.S. Official Action mailed Jul. 16, 2013 in U.S. Appl. No. 11/313,327.
U.S. Official Action mailed Nov. 18, 2013 in U.S. Appl. No. 11/624,122.

(56) References Cited

OTHER PUBLICATIONS

U.S. Official Action mailed Dec. 20, 2013 in U.S. Appl. No. 11/313,324.
U.S. Appl. No. 14/152,095, filed Jan. 10, 2014 entitled "System and Method for Multi-Dimensional Average-Weighted Banding Status and Scoring".
U.S. Official Action mailed Jan. 22, 2014 in U.S. Appl. No. 11/313,327, 25 pgs.
U.S. Official Action mailed Jan. 22, 2014 in U.S. Appl. No. 11/623,953, 33 pgs.
U.S. Official Action mailed Feb. 5, 2014 in U.S. Appl. No. 11/668,763, 27 pgs.
U.S. Official Action mailed Feb. 13, 2014 in U.S. Appl. No. 13/404,032, 35 pgs.
U.S. Official Action mailed Feb. 24, 2014 in U.S. Appl. No. 11/313,390, 24 pgs.
U.S. Official Action mailed May 8, 2014 in U.S. Appl. No. 11/623,953, 26 pgs.
U.S. Official Action mailed Jun. 3, 2014 in U.S. Appl. No. 11/313,324, 24 pgs.
U.S. Official Action mailed Jun. 24, 2014 in U.S. Appl. No. 11/313,327, 25 pgs.
Jungmann, Jens Heiner. "A Dynamic Approach to Query Optimization in Centralized Relational Databases." Order No. 1348599 The University of Texas at Arlington, 1992; Ann Arbor: ProQuest; Web. Aug. 28, 2014; 128 pgs.
U.S. Official Action mailed Sep. 5, 2014 in U.S. Appl. No. 13/404,032, 16 pgs.
U.S. Official Action mailed Sep. 22, 2014 in U.S. Appl. No. 11/668,763, 81 pgs.
U.S. Official Action mailed Sep. 25, 2014 in U.S. Appl. No. 13/948,306, 67 pgs.
U.S. Official Action mailed Oct. 28, 2014 in U.S. Appl. No. 11/623,818, 33 pgs.
U.S. Official Action mailed Dec. 5, 2014 in U.S. Appl. No. 11/623,953, 36 pgs.
U.S. Official Action mailed Dec. 9, 2014 in U.S. Appl. No. 11/313,327, 10 pgs.
U.S. Official Action mailed Aug. 26, 2013 in U.S. Appl. No. 11/313,390.
U.S. Official Action mailed Oct. 7, 2013 in U.S. Appl. No. 11/313,899.
U.S. Official Action mailed Jan. 5, 2015 in U.S. Appl. No. 11/313,899, 31 pgs.
U.S. Official Action mailed Mar. 19, 2015 in U.S. Appl. No. 131948,306, 27 pgs.
U.S. Official Action mailed Apr. 9, 2015 in U.S. Appl. No. 11/313,390, 32 pgs.

* cited by examiner

EXAMPLE SCORECARD
APPLICATION SCREENSHOT

SCORECARD
EXPORT
SCREENSHOTS

EXAMPLE SCORECARD AND REPORTS IN PRESENTATION APPLICATION

|  | 702 | 704 | 706 | 708 |
|--|--|--|--|--|
|  | View 1 | View 2 | View 3 | Metrics & Reports |
|  | X |  |  | KPI 1 |
|  |  | X |  | KPI 1.1 |
|  |  | X |  | KPI 1.2 |
|  |  |  | X | KPI 1.3 |
|  |  |  | X | Report 1.3.1 |
|  |  |  | X | Report 1.3.2 |
|  |  | X |  | KPI 1.4 |
|  |  |  |  | KPI 2 |
|  |  | X |  | KPI 2.1 |
|  |  | X |  | KPI 2.2 |
|  | X |  | X | Report A |
|  | X |  | X | Report B |
|  |  |  | X | Report C |

*SELECTION OF METRICS AND REPORTS FOR DIFFERENT VIEWS*

| Sales Briefing Book ||
|--|--|
| Views | Elements |

| Region | Time | Elements |
|--|--|--|
|  |  | Trend Graphs |
| X |  | Geographic Breakdown |
| X |  | Compensation Analysis |
|  | X | Regional Commentary |
|  | X | Revenue Goals |
|  | X | By Manager |
| X |  | By District |
|  |  | By Region |

714 → 712
716 718

*SELECTION OF ELEMENTS FOR DIFFERENT VIEWS*

FIG. 7B

USE OF COMPOSITE OBJECTS IN
EXPORTING SCORECARD DATA

EXAMPLE USE OF CACHED DATA
IN PRESENTATION

PRESENTATION GENERATION USING SCORECARD ELEMENTS

BACKGROUND

Key Performance Indicators are quantifiable measurements that reflect the critical success factors of an organization ranging from income that comes from return customers to percentage of customer calls answered in the first minute. Key Performance Indicators may also be used to measure performance in other types of organizations such as schools, social service organizations, and the like. Measures employed as KPI within an organization may include a variety of types of revenue in currency, growth or decrease of a measure in percentage, actual values of a measurable quantity, and the like.

The systems within which performance data (e.g. business performance data) is modeled and processed are typically not well aligned with the productivity tools used to present data, such as presentation applications. Many hours are spent manually transferring and then formatting data from the business system into the presentation tools, often on a periodic basis for reporting. The productivity loss to enterprise engaging in low level activities combined with the potential for error and misinformation represents vast amounts of wasted resource.

SUMMARY

This summary is used to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to generating renderings of scorecard elements, reports, and associated unstructured data independent from a scorecard application. Views selected by a user may be combined, grouped, or paginated based on default and/or user-defined parameters of the rendering application such as a presentation application. Views may also be reformatted, resized, and laid out according to rendering application preferences.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 7A illustrates selection of metrics and reports of a scorecard for different views;

FIG. 7B illustrates selection of elements of a scorecard beyond metrics and reports for different views;

DETAILED DESCRIPTION

As briefly described above, users of business logic applications processing scorecards may be enabled to visually select elements and reports associated with a scored for generation of a presentation of other output based on the scorecard data. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules includes routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
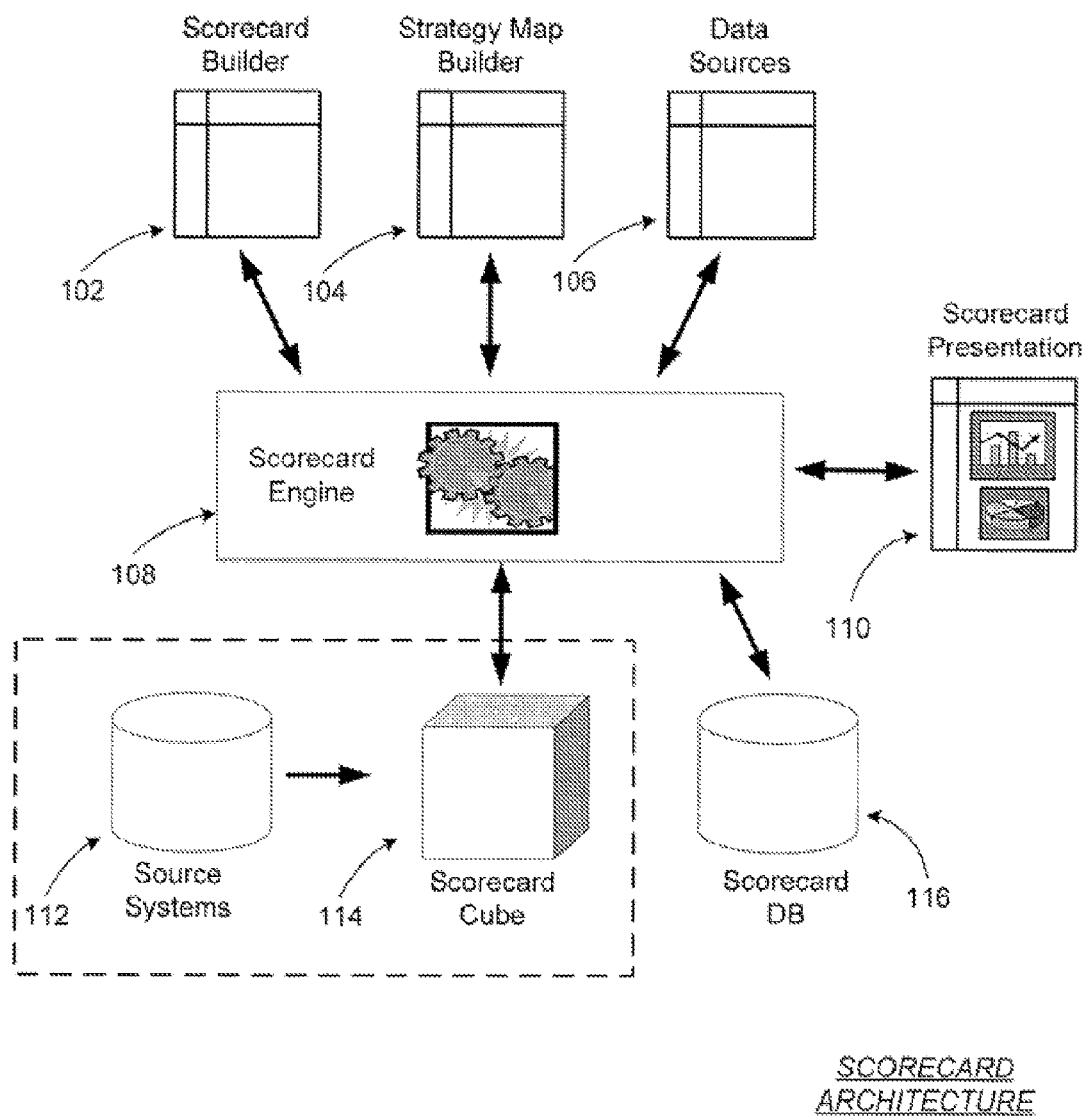
FIG. 1 illustrates an example scorecard architecture according to aspects.

Referring to FIG. 1, an example scorecard architecture is illustrated. The scorecard architecture may comprise any topology of processing systems, storage systems, source systems, and configuration systems. The scorecard architecture may also have a static or dynamic topology.

Scorecards are an easy method of evaluating organizational performance. The performance measures may vary from financial data such as sales growth to service information such as customer complaints. In a non-business environment, student performance and teacher assessments may be another example of performance measures that can employ scorecards for evaluating organizational performance. In the exemplary scorecard architecture, a core of the system is scorecard engine 108. Scorecard engine 108 may be an application software that is arranged to evaluate performance metrics. Scorecard engine 108 may be loaded into a server, executed over a distributed network, executed in a client device, and the like.

Data for evaluating various measures may be provides by a data source. The data source may include systems 112, which provide data to a scorecard cube 114. Source systems 112 may include multi-dimensional databases such OLAP, other databases, individual files, and the like, that provide raw data for generation of scorecards. Scorecard cube 114 is a multi-dimensional database for storing data to be used in determining Key Performance Indicators (KPIs) as well as generated scorecards themselves. As discussed above, the multi-dimensional nature of scorecard cube 114 enables storage, use, and presentation of data over multiple dimensions such as compound performance indicators for different geographic areas, organizational groups, or even for different time intervals. Scorecard cube 114 has a bi-directional interaction with scorecard engine 108 providing and receiving raw data as well as generated scorecards.

Scorecard database 116 is arranged to operate in a similar manner to scorecard cube 114. In one embodiment, scorecard database 116 may be an external database providing redundant back-up database service.

Scorecard builder 102 may be a separate application or part of a business logic application such as the performance evaluation application, and the like. Scorecard builder 102 is employed to configure various parameters of scorecard engine 108 such as scorecard elements, default values for actuals, targets, and the like. Scorecard builder 102 may include a user interface such as a web service, a GUI, and the like.

Strategy map builder 104 is employed for a later stage in scorecard generations process. As explained below, scores for KPIs and other metrics may be presented to a user in form of a strategy map. Strategy map builder 104 may include a user interface for selecting graphical formats, indicator elements, and other graphical parameters of the presentation.

Data Sources 106 may be another source for providing raw data to scorecard engine 108. Data sources 106 may also define KPI mappings and other associated data.

Additionally, the scorecard architecture may include scorecard presentation 110. This may be an application to deploy scorecards, customize views, coordinate distribution of scorecard data, and process web-specific applications associated with the performance evaluation process. For example, scorecard presentation 110 may include a web-based printing system, and email distribution system, and the like. In some embodiments, scorecard presentation 110 may be an interface that is used as part of the scorecard engine to export data for generating presentations or other forms of scorecard-related documents in an external application. For example, metrics, reports, and other elements (e.g. commentary) may be provided with metadata to a presentation application (e.g. PowerPoint® of MICROSOFT CORPORATION of Redmond, Wash.) a word processing application, or a graphics application to generate slides, documents, images, and the like, based on selected scorecard data.

Figure 2:
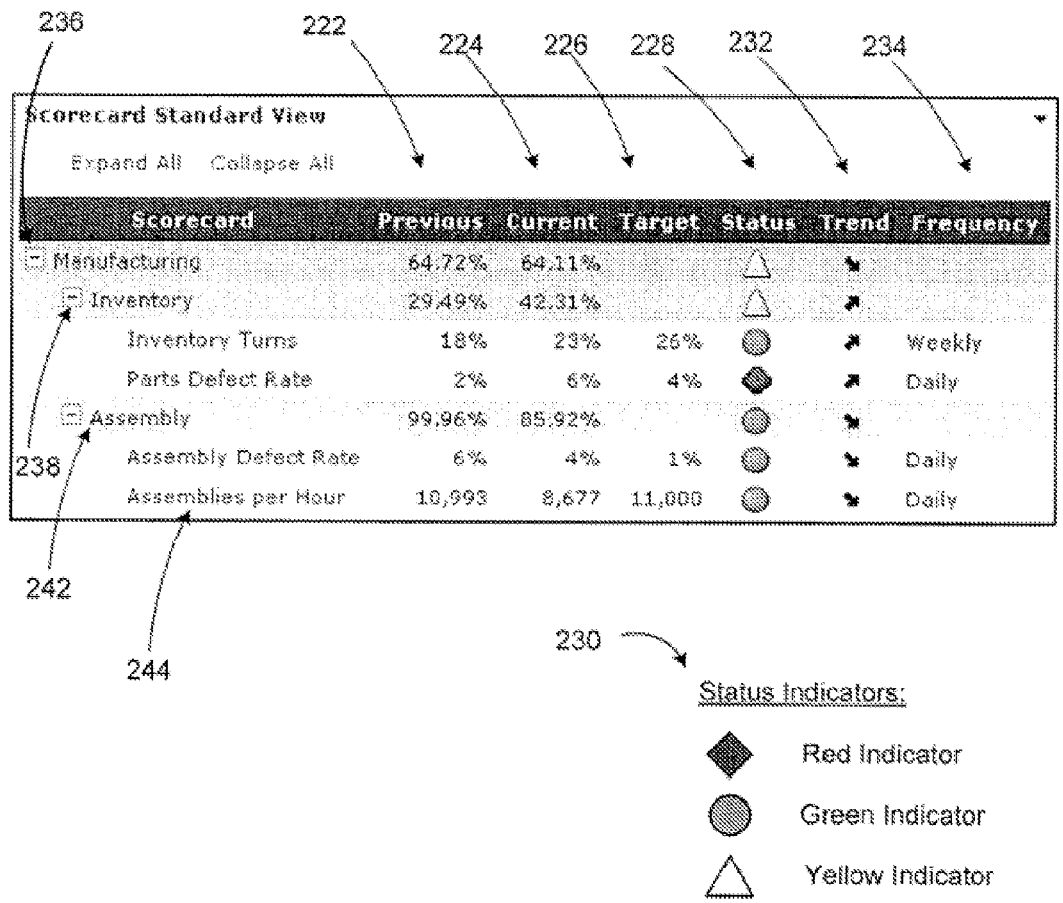
FIG. 2 illustrates a screenshot of an example scorecard.

FIG. 2 illustrates a screenshot of an example scorecard with status indicators 230. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. This may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes.

The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rate is not. The trend type may be used in determining the KPI status to display and in setting and interpreting the KPI banding boundary values. The arrows displayed in the scorecard in FIG. 2 indicate how the numbers are moving this period compared to the last. If in this period the number is greater than the last period, the trend is up regardless of the trend type. Possible trend types may include: Increasing Is Better, Decreasing Is Better, and On-Target Is Better.

Weight is a positive integer used to qualify the relative value of the KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their present metric.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one may be off target. By utilizing the hierarchical scorecard definition along with the KPI weightings, a status value is calculated at each level of the scorecard.

First column of the scorecard shows example top level metric 236 "Manufacturing" with its reporting KPIs 238 and 242 "Inventory" and "Assembly". Second column 222 in the scorecard shows results for each measure from a previous measurement period. Third column 224 shows results for the same measures for the current measurement period. In one embodiment, the measurement period may include a month, a quarter, a tax year, a calendar year, and the like.

Fourth column 226 includes target values for specified KPIs on the scorecard. Target values may be retrieved from a database, entered by a user, and the like. Column 228 of the scorecard shows status indicators 230.

Status indicators 230 convey the state of the KPI. An indicator may have a predetermined number of levels. A traffic light is one of the most commonly used indicators. It represents a KPI with three levels of results—Good, Neutral, and Bad. Traffic light indicators may be colored red, yellow, or green. In addition, each colored indicator may have its own unique shape. A KPI may have one stoplight indicator visible at any given time. Other types of indicators may also be employed to provide status feedback. For example, indicators with more than three levels may appear as a bar divided into sections, or bands. Column 232 includes trend type arrows as explained above under KPI attributes. Column 234 shows another KPI attribute, frequency.

Figure 3:
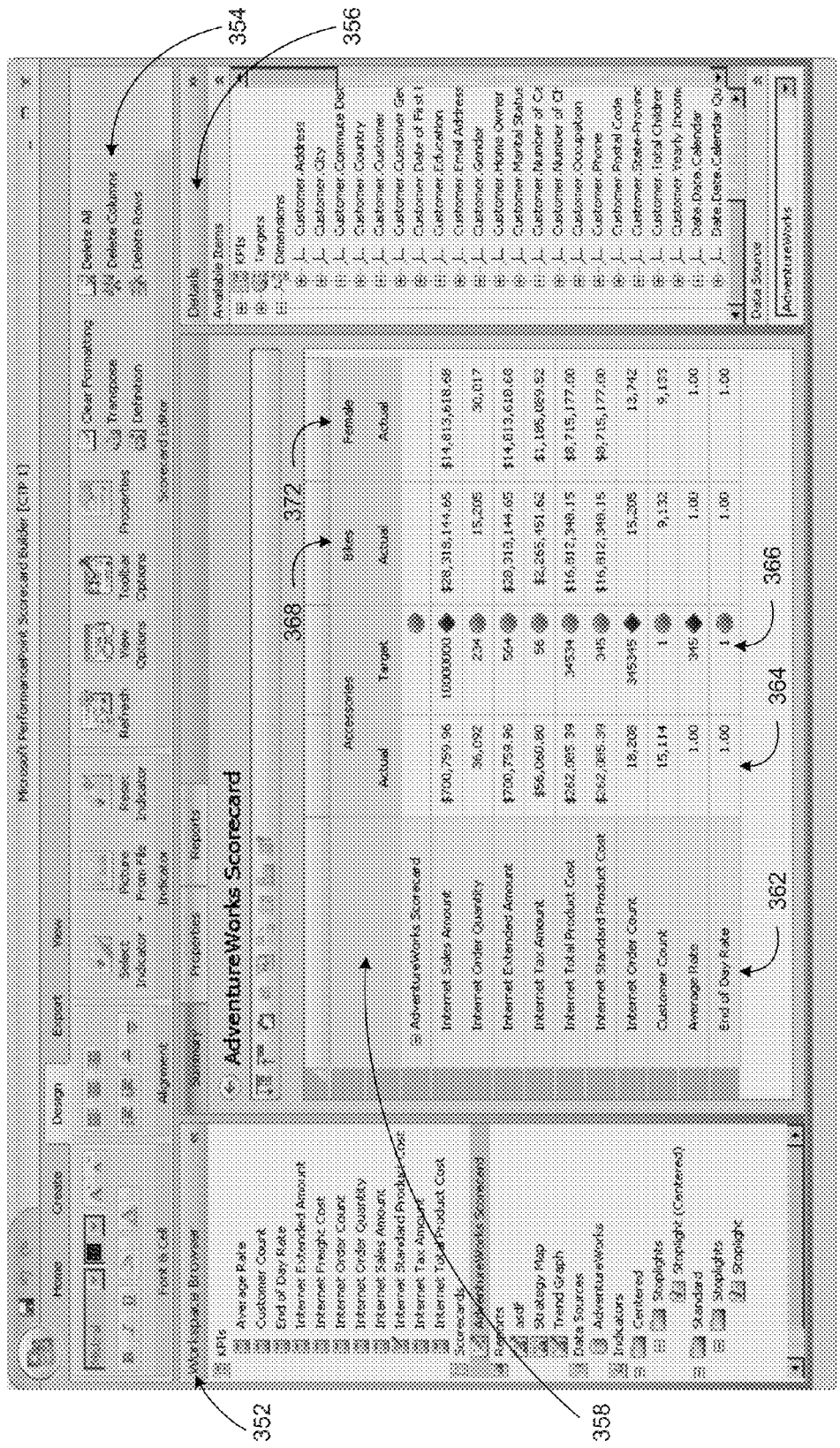
FIG. 3 is a screenshot of an example scorecard application with an example scorecard.

FIG. 3 is a screenshot of an example scorecard application with an example scorecard. The example scorecard application may be part of a business logic service that collects, processes, and analyzes performance data from various aspects of an organization.

The user interface of the scorecard application as shown in the screenshot includes controls 354 for performing actions such as formatting of data, view options, actions on the presented information, and the like. The main portion of the user interface displays scorecard 358 "Adventure Works Scorecard". The scorecard includes metrics such as "Internet Sales Amount", "Internet Order Quantity", "Customer Count", and the like in column 362. Columns 364 and 366 respectively display actuals and targets for the category of "Accessories" for each of the listed metrics. Column 368 and 372 display the actuals for the categories "Bikes" and "Female" (referring to female bikes).

Side panel 352 titled "Workspace Browser" provides a section of available KPIs as well as elements of the scorecard such indicators and reports that are associated with the selected scorecard. Other side panel 356 provides additional details about available scorecard elements such as a collapsible list of KPIs, targets, and dimension combinations.

According to some embodiments, portions of all of the presented scorecard may be exported to a presentation application for generating a presentation such as slides, images, and the like based on selected elements of the scorecard. For example, reports for selected metrics along with the source data, commentaries, and the like may be compiled into a report book to be rendered as a presentation.

Figure 4A:
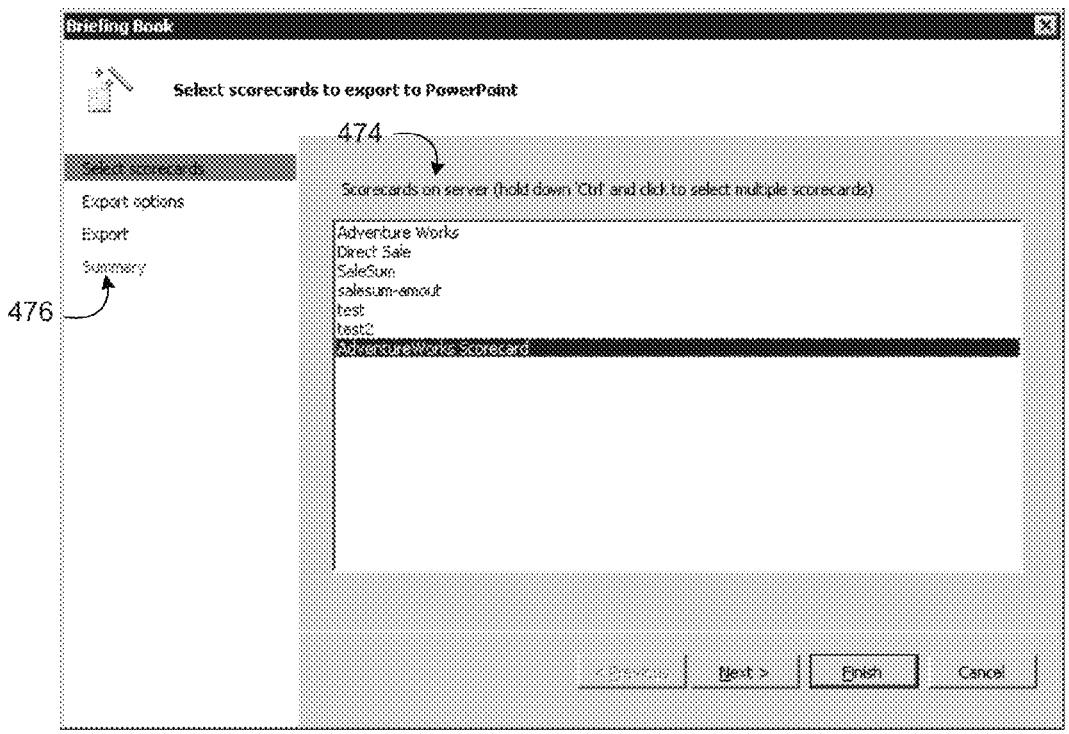
FIGS. 4A and 4B are screenshots of user interfaces of the scorecard application of FIG. 3 for exporting scorecard associated data to a presentation file.
Figure 4B:
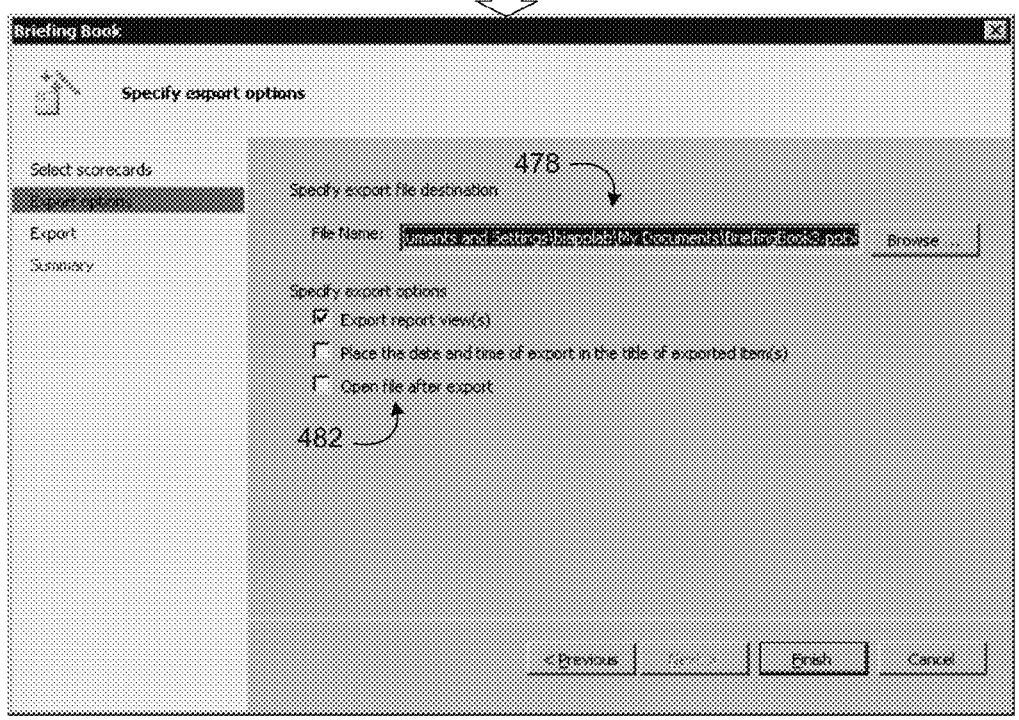

FIGS. 4A and 4B are screenshots of user interfaces of the scorecard application of FIG. 3 for exporting scorecard associated data to a presentation file. The scorecard application of FIG. 3 may handle a plurality of scorecards at any given time. Thus, a list of scorecards may be made available to a user for selection to be exported.

The user interface screenshot in FIG. 4A illustrates a control panel 476 for actions and a selection panel 474 displaying a list of available scorecards for export. The user may select a desired scorecard by clicking on its name and move to the next screen. Scorecards may be represented in the selection by their names, by icons, other graphics, combinations, and the like.

The screenshot in FIG. 4B is of the user interface when "Export Options" are selected in the control panel 276. The options may include a destination path 478 for a file to be exported to and other actions such as whether or not report view should also be exported, whether a place and time of export should be included in the title, and whether the file should be opened at the conclusion of the export (as indicated by reference numeral 482).

Figure 5:
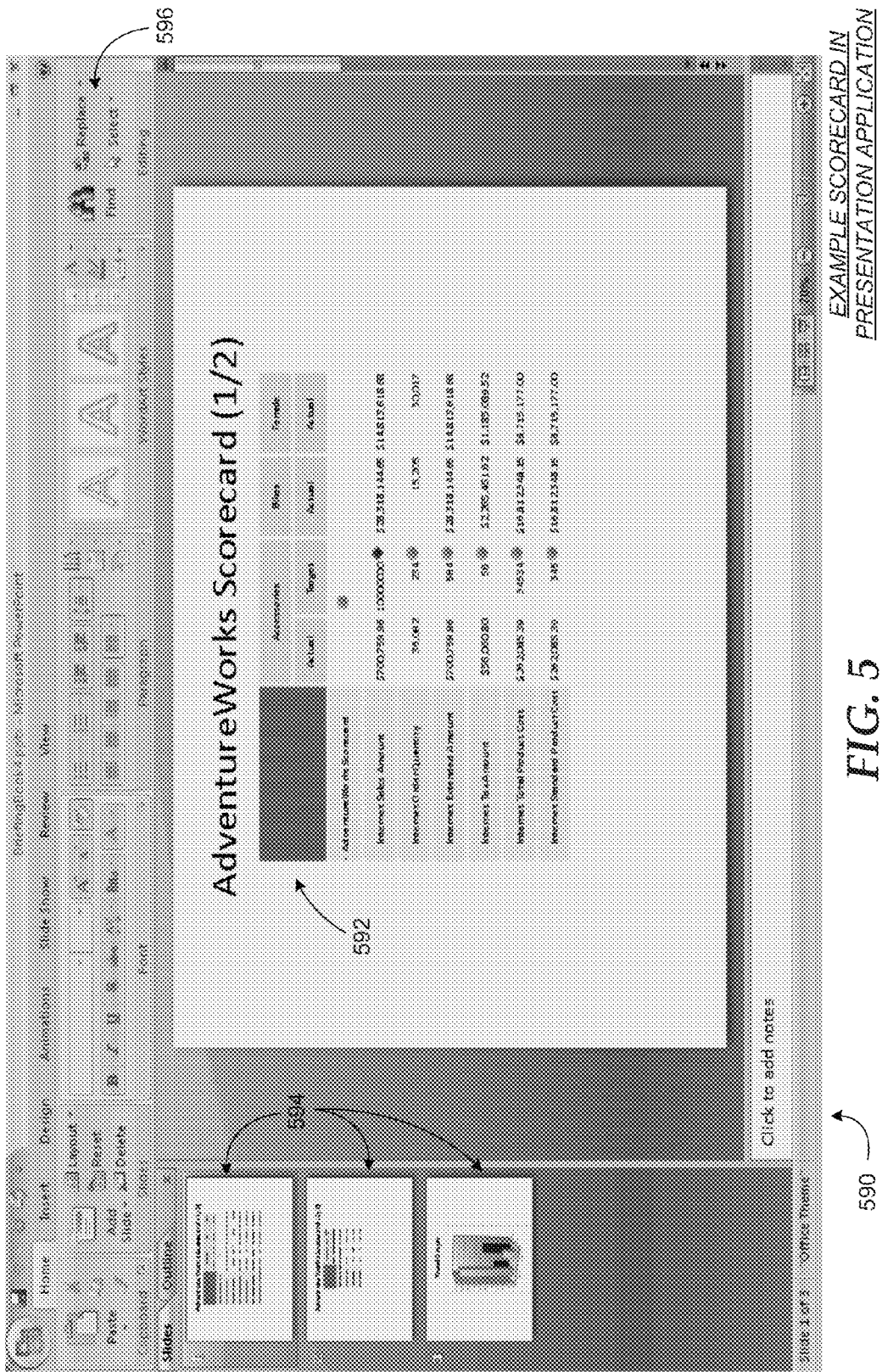
FIG. 5 illustrates a screenshot of a presentation application with the example scorecard of FIG. 3.

FIG. 5 illustrates a screenshot of presentation application 590 with the example scorecard of FIG. 3. Presentation application 590 in this example screenshot is a slide presentation application. As mentioned previously, other types of applications rendering selected scorecard elements as other types of documents (e.g. images) may also be implemented.

Presentation application 590 also includes a controls portion 596 for performing actions such as formatting, editing, and the like on the generated presentation. The main view panel of the presentation application user interface displays the example scorecard of FIG. 3. In this example scenario, all elements of the scorecard shown in FIG. 3 are selected. Therefore, the scorecard is shown without change in content. Formatting is different however. Format elements such as fonts, font sizes, background color are adjusted to default values of the presentation application. As will be discussed later in conjunction with FIG. 8, scorecard data is exported using composite objects. This enables the receiving application to reformat and resize the presented data according to its parameters.

Depending on selections made by the user during the export operation, subsets of the scorecard data, particular reports associated with the scorecard may also be rendered by presentation application 590. Other available renderings are indicated as minimized slides 594 in the side panel of the presentation application user interface.

Figure 6:
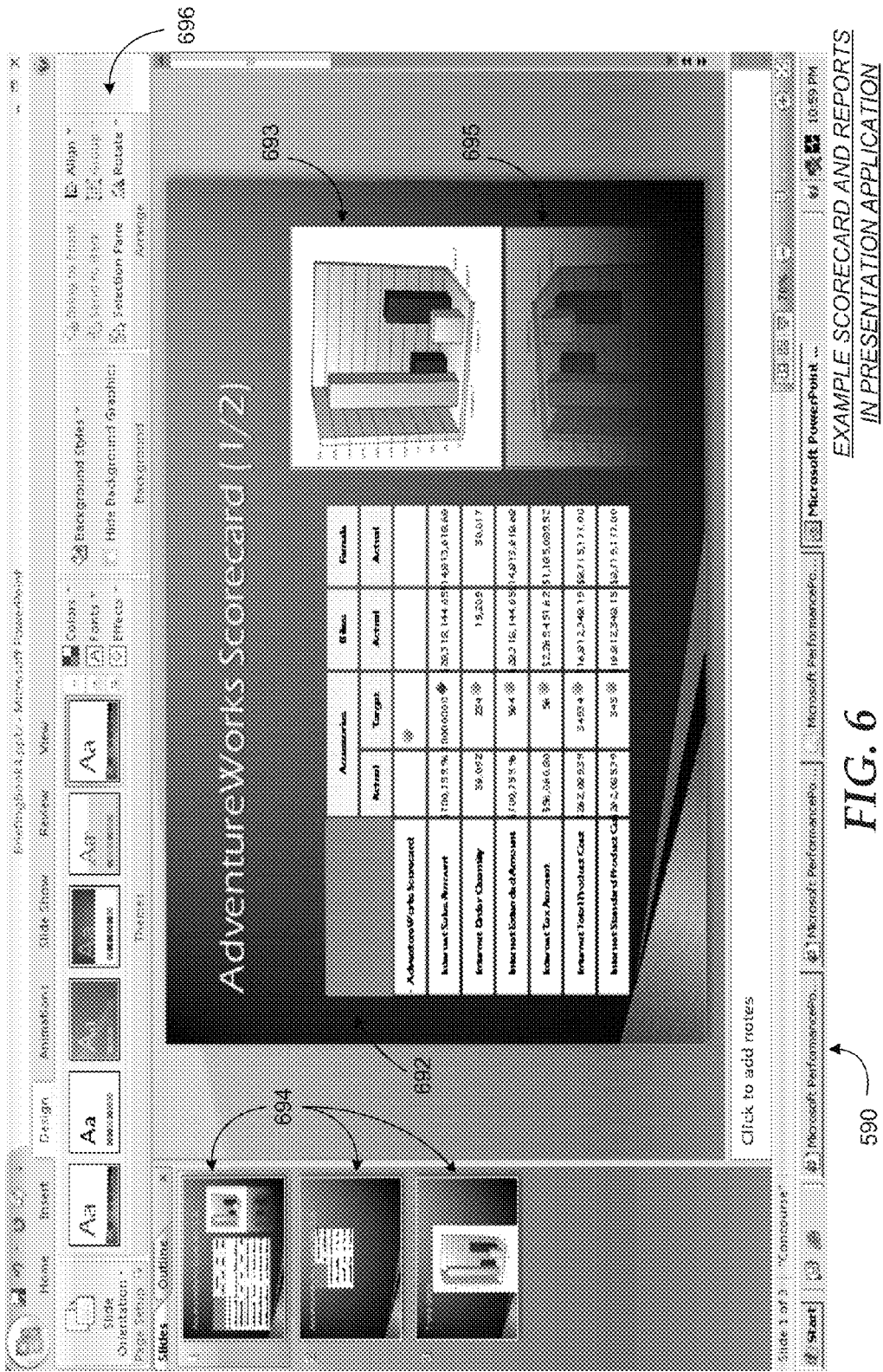
FIG. 6 is another screenshot of the presentation application of FIG. 5 showing the example scorecard and two related charts on the same slide.

FIG. 6 is another screenshot of the presentation application of FIG. 5 showing the example scorecard and two related charts on the same slide.

Controls 696 of the presentation application 590 are shown differently in the screenshot of FIG. 6. As with any application, the control may be presented in various ways depending on an operation mode, user selection, default parameters, and the like. In this example scenario, a user selection for displaying the scorecard along with two selected reports is assumed. Thus, charts 693 and 695 are displayed next to scorecard 692. The charts, as with the scorecard, may also be reformatted and resized according to the parameters of the presentation application.

According to some embodiments, the user may be provided options to select different properties of the charts during the export such as 3D vs. 2D, minimum side, etc. Other available slides in this example scenario as indicated by reference numeral 694 include a subset of the scorecard and another chart based on a selected report.

The screenshots of FIG. 3 through FIG. 6 are for illustration purposed only and do not constitute limitation on embodiments. Indeed, embodiments may be implemented with other types of applications rendering scorecard elements and reports, different selection options, presentation options, and the like, using the principles described herein.

FIG. 7A illustrates example selection of metrics and reports of a scorecard for different views. As discussed previously, a scorecard may include a number of elements such as metrics (e.g. KPIs), reports associated with selected metrics, and the like. A user may be provided with a user interface during the export process to select which metrics and/or reports they want to have exported to the presentation application.

The example scorecard includes in the metrics and reports column 708 two top level KPIs (KPI 1 and KPI 2) with a number of lower level KPIs reporting to each. One of the lower level KPIs (KPI 1.3) under KPI 1 has two reports associated with it. Additionally, three reports (Reports A, B, and C) are also listed. These may be based on a variety of selected metrics from the scorecard.

For selection a user may be provided different user interfaces, a textual listing of available elements, a table-based listing, a graphical listing utilizing icons, and so on. The example in the figure shows the elements and available number of views in a table format. The user is offered to select metrics and reports for three different views (702, 704, and 706) by selecting corresponding cells under each view. Once the selection is made, the business logic application may generate metadata reflecting the user's selections such that the output at the presentation application includes selected items.

FIG. 7B illustrates selection of elements of a scorecard beyond metrics and reports for different views. Metrics and reports are not the only elements associated with a scorecard. Other elements such as commentary, organizational data, analyses, and the like may also be included in the presentation. The example selection in FIG. 7B illustrates such a selection.

During the export process, briefing book definitions may first be generated based on scorecard element definitions and report view definitions. Selections are then made from the briefing book and subparts (e.g. trend charts, etc.). The example briefing book in the figure is "Sales Briefing Book" 710 for an organization. Elements 712 associated with the briefing book include trend graphs, goegraphic breakdown, compensation anaylsis, regional commentary, and revenue goals broken down by manager, district, and region.

Two view types are offered to the user for the above listed briefing book elements: a view by region and a view by time (716 and 718). As in the example in FIG. 7A, the user may select by clicking on corresponding cells for each view by other selections methods. Once the selections are done, the metadata is prepared for generation of the rendered book in the presentation application.

Operations in generating the presentation such as formatting, pagination, groupings, sizing, and the like may then be performed based on the metadata and default parameters of the presentation application.

Figure 8:
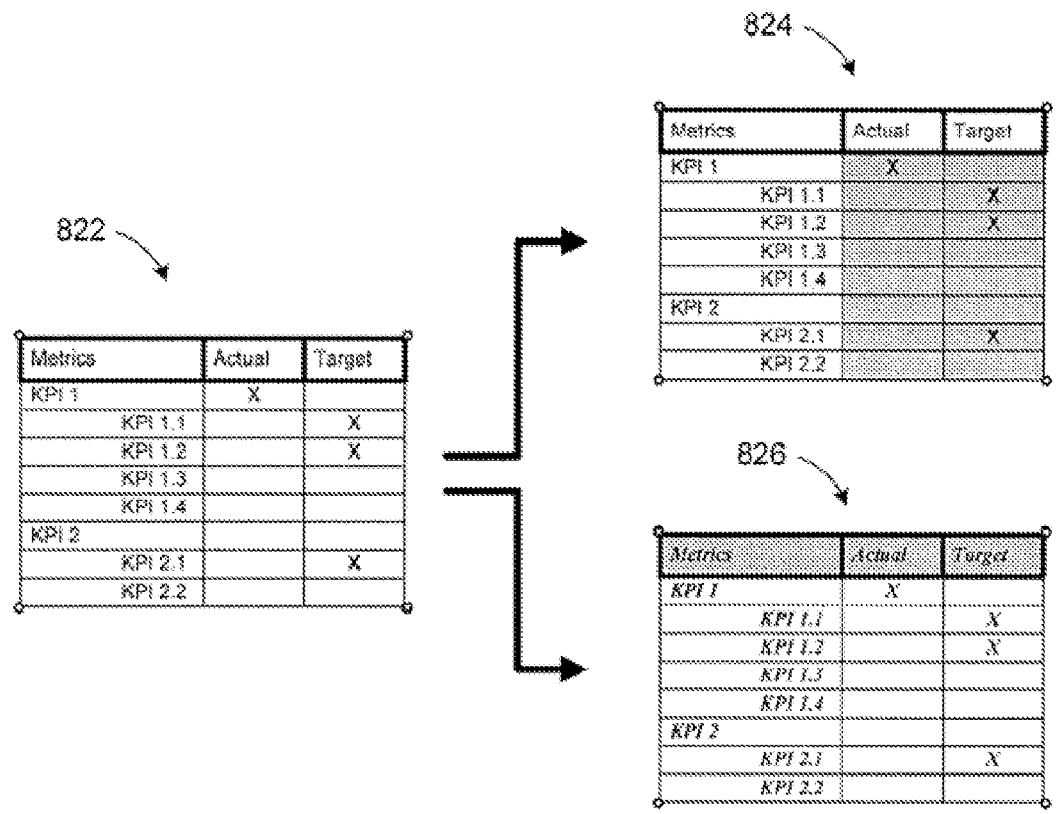
FIG. 8 illustrates example effects of using composite objects in exporting scorecard data.

FIG. 8 illustrates example effects of using composite objects in exporting scorecard data. According to some embodiments, scorecard and report views may be exported to the presentation application as composite objects as opposed to bitmap images or other types of data that may present inherent limitations.

By using composite objects to covey the data, the presentation application is enabled to modify the received views according to its default parameters or user defined values. Examples scorecard view 822 in FIG. 8 includes a listing of metrics (e.g. KPI 1, KPI 2, and their reporting KPIs) as well as the actual and target value columns. By exporting the example scorecard view 822 as a composite object to the presentation application, the business logic application enables the presentation application to modify the view according to its themes. For example, presentation view 824 includes different background coloring for the actual and target value columns while other aspects such as fonts and borders are left untouched. The second example view 826 shows background color of the header row and the font of all cells being modified to match a theme implemented by the presentation application.

Modification of view properties by using composite objects is not limited to the examples shown in the figure. Other aspects of the scorecard or report views including, but not limited to, font, font size, overall size, embellishments, text and graphic effects, and the like, may also be modified in the presentation by employing composite objects.

Figure 9:
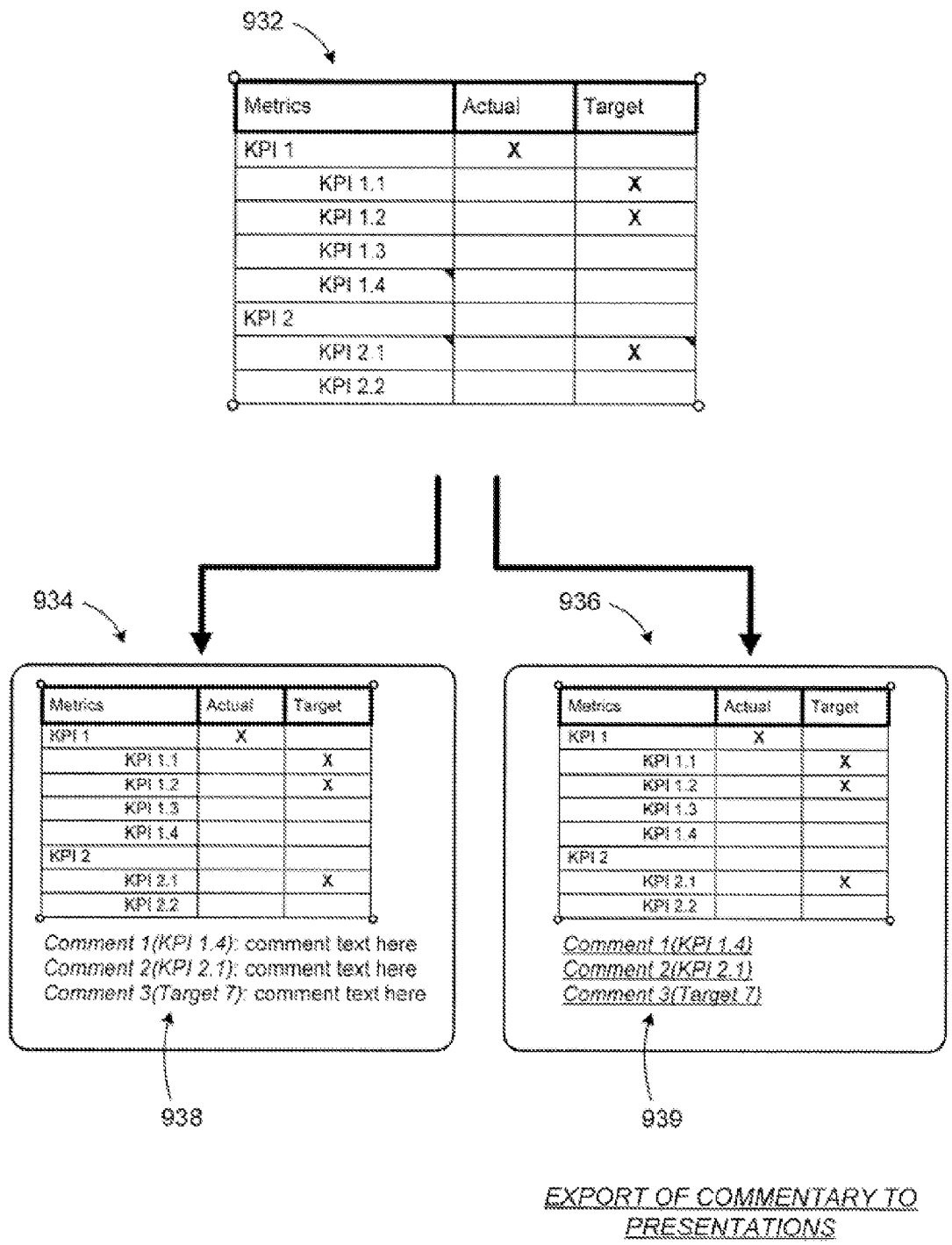
FIG. 9 illustrates different configurations of commentary export from a scorecard to a presentation.

FIG. 9 illustrates configurations of commentary export from a scorecard to a presentation. Scorecards may include commentary feature, where authorized participants can provide commentary at scorecard, element, dimension, or even cell levels. In a typical scorecard application, the commentary may be presented with an icon (e.g. a small triangle at the corner of a cell). When a user clicks on the triangle, available commentary may be displayed in text form. In a presentation, providing the commentary in the presentation may be employed.

Scorecard view 932 shows a typical scorecard with commentary indicators at the cells for KPI 1.4, KPI 2.1, and target value for KPI 2.1. When the scorecard view is exported to a presentation according to the embodiments, the commentary (938) may be listed below the scorecard view in the presentation as shown in example presentation view 934. According to another embodiment the presentation may include hyperlinks 939 for each commentary listed below the scorecard view as shown in example presentation view 936. The hyperlkinks may take the user to another slide in the presentation or document that lists all available commentary for the particular scorecard. The presentation of the commentary may take other forms not shown here including, but not limited to, placement of the commentary, format of the links, and the like.

Figure 10:
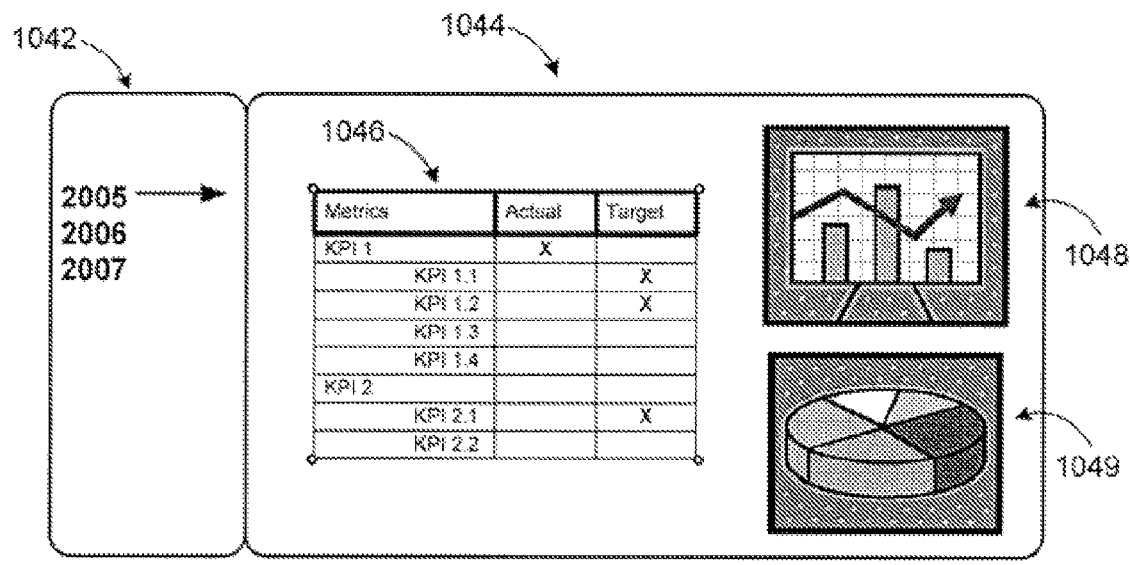
FIG. 10 illustrates an example use of cached scorecard data in a presentation.

FIG. 10 illustrates an example use of cached scorecard data in a presentation. Typically, rendering of presentations from scorecard data is a one time event and the presentations are stationary, meaning the data in the presentation is not dynamic as presented by the scorecard application. On the other hand, scorecard views (as well as report views) may be repeated for data associated with particular time period without substantially changing format. For example, a user may want to view the scorecard (select metrics) and associated reports for the fiscal year 2006. Then, the user may desire to check the views for fiscal year 2005 or any other year.

According to one embodiment, scorecard data may be cached in exporting to the presentation application such that multiple versions of the presentations can be generated for cached versions of data such as by time period. A similar caching and presentation method may be employed for other dimensions such as region, organizational unit, etc.

In the example presentation view of FIG. 10, the main view 1044 displays scorecard view 1046 with two associated charts 1048 and 1049. The data for this view (and the charts) is from fiscal year 2005 as indicated by the side panel 1042. By using the cached data to generate multiple versions of the presentations, a user may simply click on another year (e.g. 2006) on the side panel 1042 and see the same scorecard view and charts based on the metric data for 2006.

Embodiments are not limited to the example data structures, user interfaces, layouts, and operations discussed above. Many other types of operations may be performed and interfaces/layouts used to implement data driven presentation generation from scorecard data using the principles described herein.

Figure 11:
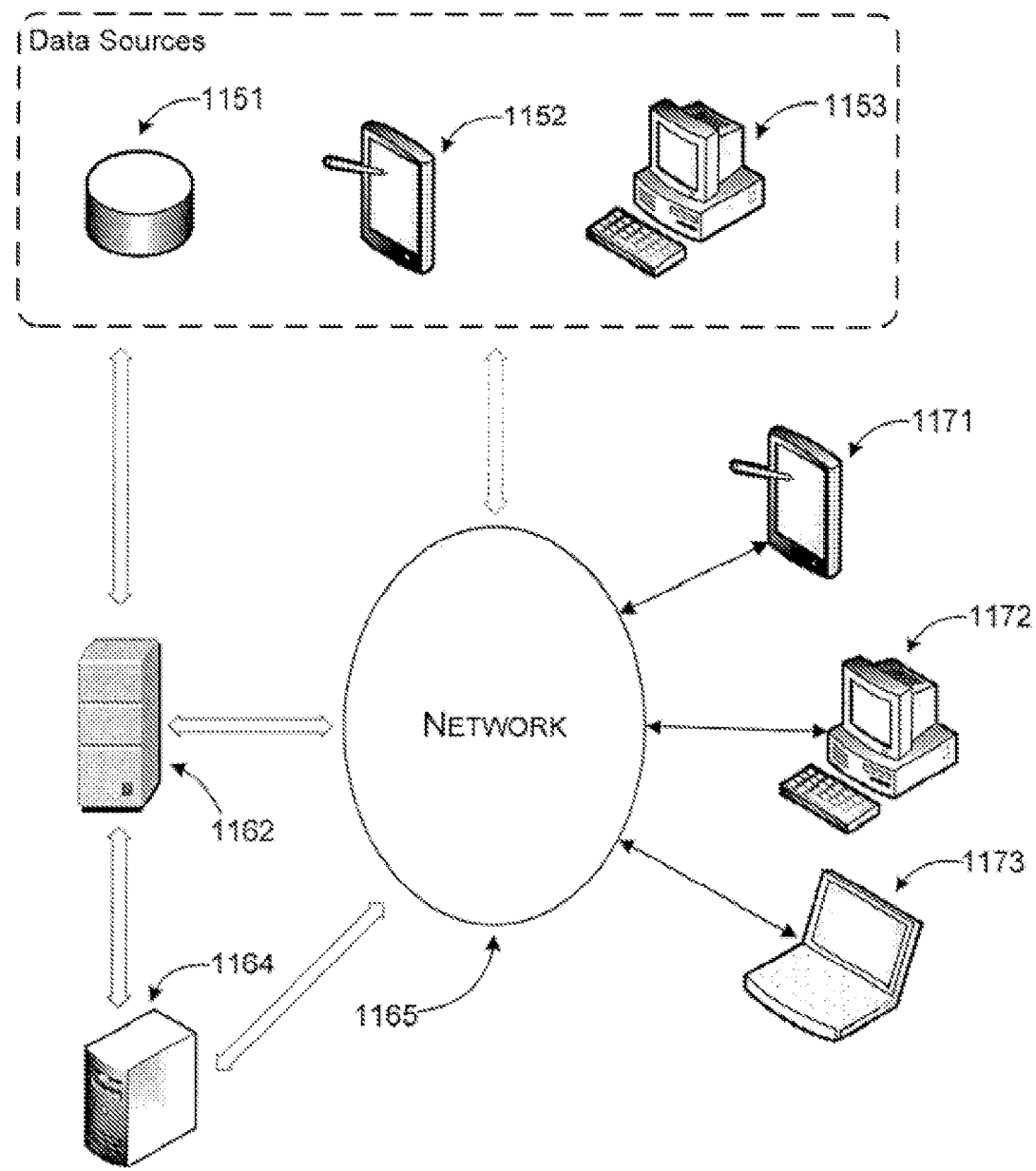
FIG. 11 illustrates data driven presentation generation within a business logic service in a networked system.
Figure 12:
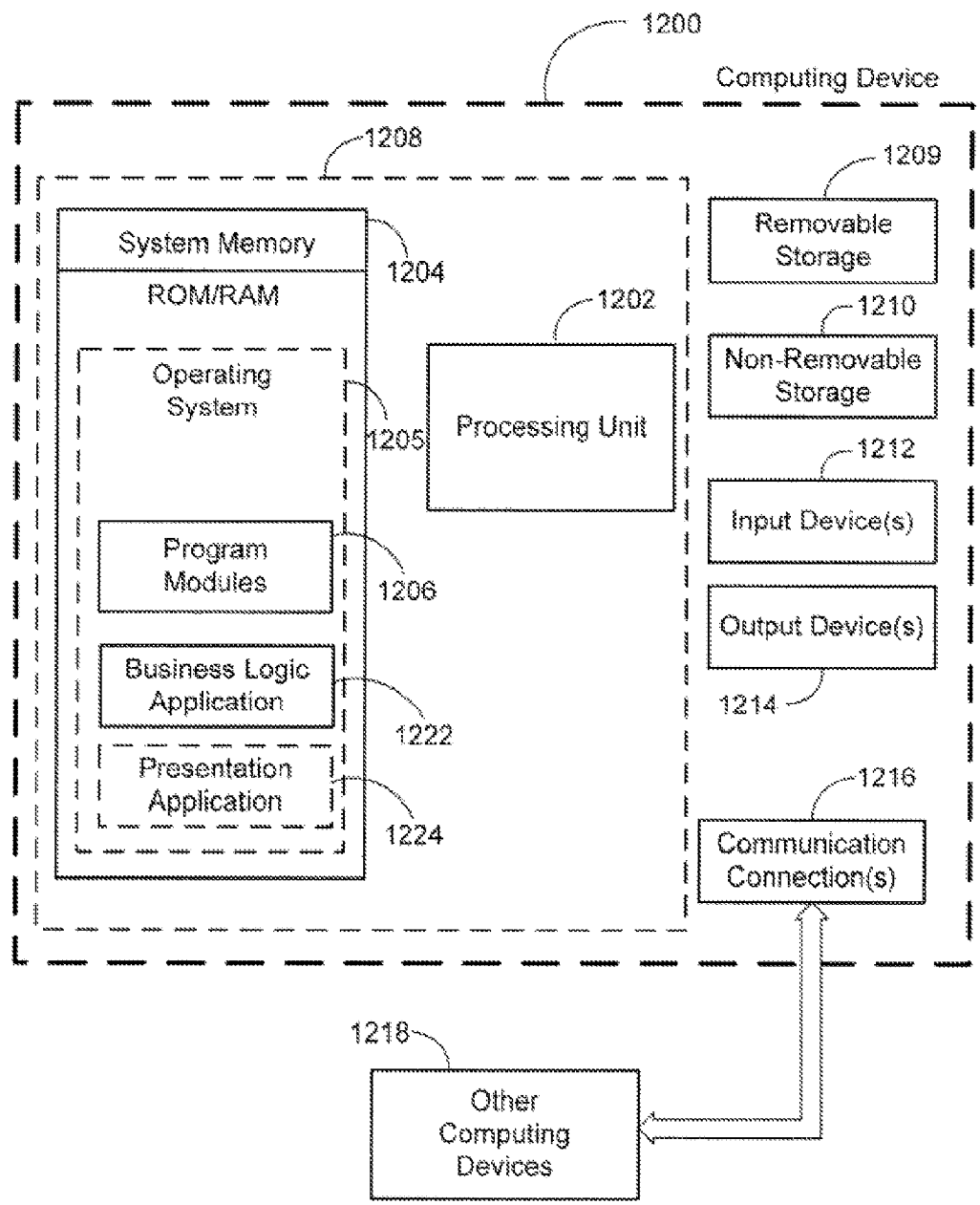
FIG. 12 is a block diagram of an example computing operating environment, where embodiments may be implemented.

Referring now to the following figures, aspects, and exemplary operating environments will be described. FIG. 11, FIG. 12, and the associated discussion are intended to provide a brief, general description of a suitable computing environment in which embodiments may be implemented.

FIG. 11 illustrates data driven presentation generation within a business logic service in a networked system. The system may comprise any topology of servers, clients, Internet service providers, and communication media. Also, the system may have a static or dynamic topology. The term "client" may refer to a client application or a client device employed by a user to perform operations associated with generating data driven presentations from a scorecard. While a networked business logic system may involve many more components, relevant ones are discussed in conjunction with this figure.

In a typical operation according to the embodiments, business logic service may be provided centrally from server 1162 or in a distributed manner over several servers (e.g. servers 1162 and 1164) and/or client devices. Server 1162 may include implementation of a number of information systems such as performance measures, business scorecards, and exception reporting. A number of organization-specific applications including, but not limited to, financial reporting/analysis, booking, marketing analysis, customer service, and manufacturing planning applications may also be configured, deployed, and shared in the networked system.

Data sources 1151-1153 are examples of a number of data sources that may provide input to server 1162. Additional data sources may include SQL servers, databases, non multi-dimensional data sources such as text files or EXCEL® sheets, multi-dimensional data source such as data cubes, and the like.

Users may interact with server running on the business logic service from client devices 1171-1173 over network 1165. In another embodiment, users may directly access the data from server 1162 and perform analysis on their own machines.

Client devices 1171-1173 or servers 1162 and 1164 may be in communications with additional client devices or additional servers over network 1165. Network 1165 may include a secure network such as an enterprise network, and unsecured network such as a wireless open network, or the Internet. Network 1165 provides communication between the nodes described herein. By way of example, and not limitation, network 1165 may include wired media such as a wired network or direct-wired connection, and wireless media such as acoustic, RF, infrared and other wireless media.

Many other configurations of computing devices, applications, data sources, data distribution and analysis systems may be employed to implement data driven generation of presentations. Furthermore, the networked environments discussed in FIG. 11 are for illustration purposes only. Embodiments are not limited to the example applications, modules, or processes. A networked environment for may be provided in many other ways using the principles described herein.

With reference to FIG. 12, a block diagram of an example computing operating environment is illustrated, such as computing device 1200. In a basic configuration, the computing device 1200 typically includes at least one processing unit 1202 and system memory 1204. Computing device 1200 may include a plurality of processing units that cooperate in executing programs. Depending on the exact configuration and type of computing device, the system memory 1204 may be volatile (such as RAM), non-volatile (such as ROM, flash memory, etc.) or some combination of the two. System memory 1204 typically includes an operating system, 1205 suitable for controlling the operation of a networked personal computer, such as the WINDOWS® operating systems from MICROSOFT CORPORATION of Redmond, Wash. The system memory 1204 may also include one or more software applications such as program modules 1206, business logic application 1222, and presentation application 1224.

Business logic application 1222 may be any application that processes and generates scorecards and associated data. While presentation application 1224 may include any type of presentation application, such as one generating slide presentations, it may also include other applications that generate different forms of output based on scorecard data such as documents, images, graphics files, and the like. Presentation application 1224 may be an integrated part of business logic application 1222 or operate remotely and communicate with the application and with other applications running on computing device 1200 or on other devices. Furthermore, presentation application 1224 or business logic application 1222 may be executed in an operating system other than operating system 1205. The basic configuration is illustrated in FIG. 12 by those components with dashed line 1208.

The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by removable storage 1209 and non-removable storage 1210. Computer storage media may include volatile and nonvolatile, removable and non-removable media implemented in any method or technology for storage or information, such as computer readable instructions, data structures, program modules, or other data. System memory 1204, removable storage 1209 and non-removable storage 1210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of device 1200. Computing device 1200 may also have input device(s) 1212 such as keyboard, mouse, pen, voice input device, touch input device, etc. Output device(s) 1214 such as display, speakers, printer, etc. may also be included. These devices are well known in the art and need not to be discussed at length here.

The computing device 1200 may also contain communication connections 126 that allow the device to communicate with other computing devices 1218, such as over a network in a distributed computing environment, for example, an intranet or Internet Communication connection 1216 is one example of communication media. Communication media may typically be embodied by computer readable instruction, data structures, program modules, or other data in a modulated data signal, such as carrier wave or other transport mechanism, and includes any information of delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 13:
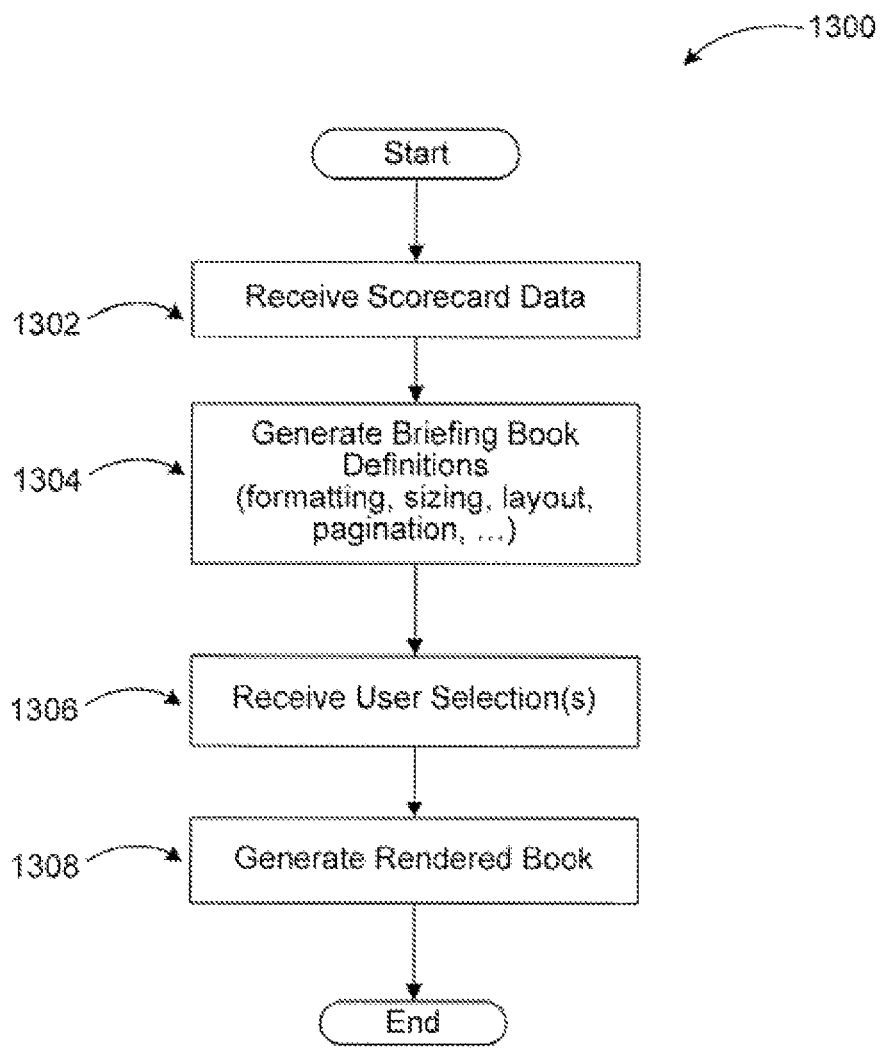
FIG. 13 illustrates a logic flow diagram for a process of generating a presentation from a scorecard in a data driven manner.

FIG. 13 illustrates a logic flow diagram for a process of generating a presentation from a scorecard in a data driven matter. Process 1300 may be implemented in a business logic application that processes and/or generates scorecards and scorecard-related reports.

Process 1300 begins with operation 1302, where scorecard data is received for exporting to the presentation application. The scorecard data may be provided by a plurality of sources such as those discussed in FIGS. 1, 2, and 11. The data may include scorecard view of all or a subpart of the metrics associated with the scorecard, reports associated with all or a subpart of the metrics, unstructured data such as commentary or annotations, attributes or properties associated with the scorecard elements and views. Processing advances from operation 1302 to operation 1304.

At operation 1304, briefing book definitions are generated based on the received data, default parameters, and user-defined parameters. Depending on what type of presentation is to be generated, charts may be created based on the data; scorecard and report views may be reformatted, resized, paginated (broken down to multiple pages or images). Moreover, presentation elements such as slides may be grouped, matched to a theme of the presentation, and unstructured data inserted in the layout of the views as defined by the default or user-defined parameters. The briefing book may then be provided to a user for selection of subparts such as charts, scorecard views, as well as other presentation parameters. Processing proceeds from operation 1304 to operation 1306.

At operation 1306, user selection(s) are received for the rendered book. For example, a user may select a portion if the available charts, particular elements of the scorecard to be presented, and the like. The user may also modify presentation parameters, which defined formatting, sizing, layout, pagination, and the like, of the selected parts. Processing moves from operation 1306 to operation 1308.

At operation 1308, the presentation book is rendered based on the user selections, metadata, and presentation application parameters. During the generation of the rendered book, images may be compressed, slides grouped by metrics, snapshots generated, and views scaled. The rendered book may also include multiple versions of the presentation based on cached scorecard data (e.g. for different fiscal years).

Following the generation of the presentation, the rendered book may be provided to subscribers using predefined security measures by electronic mail, downloading, and the like. After operation 1308, processing moves to a calling process for further actions.

The operations included in process 1300 are for illustration purposes. Generating presentations from scorecards in a data driven manner may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system for rendering a presentation based on a scorecard, comprising:
   a memory;
   a processor coupled to the memory, wherein the processor is configured to execute instructions to perform actions including:
   receive data associated with the scorecard for exporting to a presentation application, wherein the data includes at least one from a set of: a partial scorecard view, a full scorecard view, a report view, and unstructured data;
   auto-align and associate the data with a plurality of presentation parts;
   generate a set of definitions for the presentation parts based on at least one from a set of: the received data, default parameters of the presentation application, and subscriber-defined parameters associated with the presentation;
   present, based on a permission infrastructure, a subscriber with selection options among available presentation parts and options for redefining attributes of selected presentation parts, the attributes comprising a setting of a view type for the presentation, the view type comprising one of the following: a view by region and a view by time;
   receive a subscriber selection of at least one of the available presentation parts, the selection defining at least one attribute associated with the selected at least one presentation part;
   create a composite object for export to the presentation application based on the received subscriber selection, the composite object being configured to define metrics associated with the selected at least one presentation part and a layout of the metrics within the presentation associated with the at least one attribute defined by the selection; and
   exporting to the presentation application the composite object that is modifiable by the presentation application.

2. The system of claim 1, wherein the processor is further configured to receive the data from a plurality of data sources associated with a business logic service.

3. The system of claim 1, wherein the processor is further configured to provide different selection options to different subscribers based on a permission level of each subscriber.

4. The system of claim 1, wherein the processor is further configured to provide the data to the presentation application in Extensible Markup Language (XML) format.

5. The system of claim 1, wherein the processor is further configured to provide a rendered presentation to a predefined number of subscribers through one of an electronic mail, an instant message, and a download process.

6. A method to be executed at least in part in a computing device for rendering a presentation based on a scorecard, the method comprising:
   receiving data associated with the scorecard for exporting to a presentation application, the data comprising a plurality of scorecard metrics;
   generating, based on the received data, a briefing book comprising preliminary parts of the presentation and options for a view type for each of the preliminary parts;
   providing the briefing book to a user and receiving a user selection of at least one of the preliminary presentation parts and a user selection of a corresponding view type for each of the selected at least one presentation parts;

creating a composite object for export to the presentation application based on the scorecard data and the received user selections, the composite object being modifiable once received by the presentation application to meet the formatting requirements of the presentation while preserving the content of the scorecard;

exporting the composite object to a presentation application; and rendering the presentation by the presentation application, the composite object being used by the presentation application to build the presentation.

7. The method of claim 6, wherein the method further comprises:

reformatting and resizing the briefing book based on an attribute of the presentation.

8. The method of claim 6, wherein the presentation includes at least one of: a slide presentation file, an image file, a graphics file, and a composite document file.

9. The method of claim 6, wherein the method further comprises:

grouping the composite object based on at least one from a set of: the user selections, an attribute of the presentation, and the briefing book structure.

10. The method of claim 6, wherein the briefing book is provided to the presentation application as a composite object.

11. A system for rendering a presentation based on a scorecard, comprising:

a memory;

a processor coupled to the memory, wherein the processor is configured to execute instructions to perform actions including:

receive data associated with the scorecard for exporting to a presentation application, the data comprising a plurality of scorecard metrics;

generate, based on the received data, a briefing book comprising preliminary parts of the presentation and options for a view type for each of the preliminary parts;

provide the briefing book to a user and receiving a user selection of at least one of the preliminary presentation parts and a user selection of a corresponding view type for each of the selected at least one presentation parts;

create a composite object for export to the presentation application based on the scorecard data and the received user selections, the composite object being modifiable once received by the presentation application to meet the formatting requirements of the presentation while preserving the content of the scorecard;

export the composite object to a presentation application; and render the presentation by the presentation application, the composite object being used by the presentation application to build the presentation.

12. The system of claim 11, wherein the processor is further configured to execute instructions to perform actions including reformat and resize the briefing book based on an attribute of the presentation.

13. The system of claim 11, wherein the presentation includes at least one of: a slide presentation file, an image file, a graphics file, and a composite document file.

14. The system of claim 11, wherein the processor is further configured to execute instructions to perform actions including group the composite object based on at least one from a set of: the user selections, an attribute of the presentation, and the briefing book structure.

15. The system of claim 11, wherein the briefing book is provided to the presentation application as a composite object.

* * * * *